US012811389B2

(12) United States Patent
Anderson

(10) Patent No.: US 12,811,389 B2
(45) Date of Patent: Nov. 24, 2026

(54) PROTECTION CIRCUIT FOR ELECTRICAL POWER DISTRIBUTION SYSTEM COMPONENTS

(71) Applicant: TechHold, LLC, Minneapolis, MN (US)

(72) Inventor: David Anderson, Excelsior, MN (US)

(73) Assignee: TechHold, LLC, Minneapolis, MN (US)

( * ) Notice: Subject to any disclaimer, the term of this patent is extended or adjusted under 35 U.S.C. 154(b) by 162 days.

(21) Appl. No.: 18/804,489

(22) Filed: Aug. 14, 2024

(65) Prior Publication Data

US 2025/0062606 A1 Feb. 20, 2025

Related U.S. Application Data

(60) Provisional application No. 63/519,444, filed on Aug. 14, 2023.

(51) Int. Cl.
*H02H 7/04* (2006.01)

(52) U.S. Cl.
CPC .................................... *H02H 7/04* (2013.01)

(58) Field of Classification Search
CPC ............ H02H 7/04; H02H 5/005; H02H 3/14; H02H 9/04
USPC ........................................................... 361/35
See application file for complete search history.

(56) References Cited

U.S. PATENT DOCUMENTS 8,537,508 B2 9/2013 Faxvog et al.
8,642,900 B2 2/2014 Nordling et al.
8,860,402 B2 10/2014 Jackson et al.
8,878,396 B2 11/2014 Faxvog et al.
9,660,441 B2 5/2017 Fuchs et al.
10,985,559 B2 4/2021 Anderson et al.
11,469,590 B2 10/2022 Anderson et al.
2012/0019965 A1* 1/2012 Faxvog .................... H02H 3/52 361/627
2013/0308229 A1 11/2013 Faxvog et al.
2015/0311697 A1 10/2015 Faxvog et al.
(Continued)

FOREIGN PATENT DOCUMENTS

CN 106 340 854 A 1/2017
WO 2022/170282 A1 8/2022

OTHER PUBLICATIONS

International Search Report and Written Opinion issued in PCT/US2024/042267, mailed Dec. 9, 2024.

*Primary Examiner* — Sreeya Sreevatsa
(74) *Attorney, Agent, or Firm* — Merchant & Gould, P.C.

(57) ABSTRACT

Circuits and methods of protection of an electrical power distribution system components, such as a power grid transformer, are disclosed. In example aspects, a transformer protection system may include a single switch electrically connected between a transformer neutral and ground that does not rely on zero crossing signals for actuation. In some further example aspects, the transformer protection system may include an overvoltage protection device electrically connected in parallel with a switch assembly and a DC blocking component between a transformer neutral and ground. In such arrangements, a sensor may be included within the transformer protection system to detect current through the overvoltage protection device, for example to detect activation of the overvoltage protection device.

37 Claims, 11 Drawing Sheets

(56) References Cited

U.S. PATENT DOCUMENTS

| | | | | |
|---|---|---|---|---|
| 2016/0197469 | A1 * | 7/2016 | Fuchs | H02H 7/04<br>361/35 |
| 2017/0222433 | A1 | 8/2017 | Fuchs et al. | |
| 2018/0205217 | A1 | 7/2018 | Fuchs et al. | |
| 2018/0226796 | A1 * | 8/2018 | Anderson | H02J 3/01 |
| 2019/0036326 | A1 | 1/2019 | Anderson et al. | |
| 2021/0075213 | A1 | 3/2021 | Anderson et al. | |
| 2021/0159689 | A1 | 5/2021 | Faxvog et al. | |
| 2021/0367418 | A1 | 11/2021 | Anderson et al. | |
| 2022/0254565 | A1 * | 8/2022 | Anderson | H01F 27/402 |

* cited by examiner

PROTECTION CIRCUIT FOR ELECTRICAL POWER DISTRIBUTION SYSTEM COMPONENTS

CROSS-REFERENCE TO RELATED APPLICATIONS

The present application claims priority from U.S. Provisional Patent Application No. 63/519,444, filed on Aug. 14, 2023, the disclosure of which is hereby incorporated by reference in its entirety.

BACKGROUND

Power grid transformers operate at high voltage and high current, and typically are exposed to multiple phases of alternating current carried on power lines connected thereto. In some instances, such as in the case of solar storms, high altitude nuclear electromagnetic pulse ("HEMP"), ground fault currents, and the like, quasi-direct currents may be induced on the power lines and in the neutral connections of these power grid transformers. When experienced at multiphase transformers attached to those power lines, a neutral connection of the transformer may deviate from a neutral or ground voltage. If the induced current is large enough, and if the transformer neutral is not connected to ground, a significant direct current voltage may appear at the transformer neutral.

To address this issue, existing systems have attempted to maintain an AC ground connection to the transformer neutral, thereby discharging any induced current effects. However, with significantly large induced currents, the connection of the transformer neutral to ground may cause damage due to high current passing from the transformer neutral to the ground in the event of induced DC current on the power grid lines.

An example solution to the above issues is described in U.S. Pat. No. 8,878,396. In that example solution, a pair of switches, including a low voltage, direct current switch and a high voltage, alternating current switch, are connected in series between a transformer neutral and ground. This set of switches may be actuated in sequence to ensure proper operation of the circuit. That is, first the low voltage direct current switch will open, followed by opening of the higher voltage, alternating current switch. This allows for the higher voltage rating of the alternating current switch to maintain the switch assembly in an open state without spark over, since an alternating current switch generally may be obtained that has a high voltage withstand rating. The direct current switch, on the other hand, may be faster-acting with a better ability to break direct current, but may have a lower voltage withstand rating, meaning that it may fail (spark over) at very high voltages experienced over a prolonged period of time.

Such a system has a number of advantages, in terms of its combination of responsiveness to a variety of types of conditions experienced at the transformer neutral and ability to withstand high voltage levels. However, construction of such a circuit may be complex and expensive. For example, typically direct current switches and alternating current switches may be sourced from different suppliers, and alternating current switches may not be available. Furthermore, alternating current switches often require complex control electronics which are vulnerable to a HEMP-1 pulse and alternating current switches are not designed or rated to break direct-current as they rely on current zero crossings of alternating current to extinguish the arc and break the current. Existing direct-current switches are typically more compact and easily integrable into a circuit solution, but themselves have drawbacks in the context of power grid electronics. For example, direct-current switches are not designed or rated to break both alternating current and direct current, in particular at the voltage levels and amperage levels typically seen on a power grid. As such, improvements in terms of both robustness and simplification of transformer protection circuitry are desired.

SUMMARY

Generally speaking a transformer protection system is disclosed. In example aspects, the transformer protection system may include a switch assembly having a single DC switch or breaker electrically connected between a transformer neutral and ground. In some further example aspects, the transformer protection system may include an overvoltage protection device electrically connected in parallel with a switch assembly and a DC blocking component between a transformer neutral and ground. In such arrangements, a sensor may be included within the transformer protection system to detect current through the overvoltage protection device, for example to detect activation of the overvoltage protection device.

In a first aspect, a transformer protection system is disclosed. The transformer protection system includes a protection circuit electrically connectable between a neutral connection of a power grid transformer and a ground. The protection circuit includes a single switching element, a direct current blocking component, and a control system. The single switching element is electrically connected between the neutral connection of the power grid transformer and the ground, and is movable between an open position and a closed position. The single switching element is configured to break alternating current (AC) and direct current (DC) from passing therethrough between the neutral connection and the ground without reliance on a zero-crossing of electrical current at the single switching element. The direct current blocking component is electrically connected in parallel with the single switching element between the neutral connection and the ground. The control system is electrically connected to a control input of the single switching element. The control system is electrically connected to one or more sensors associated with the protection circuit to detect electrical events at the transformer neutral and, in response, actuate the single switching element between the open position and the closed position.

In a second aspect, a transformer protection circuit electrically connected between a neutral connection of a power grid transformer and a ground is provided. The transformer protection circuit includes a switch assembly electrically connected between the neutral connection of the power grid transformer and the ground, the switch assembly being movable between an open position and a closed position, and configured to break alternating current (AC) and direct current (DC) from passing therethrough between the neutral connection and the ground. The transformer protection circuit also includes a direct current blocking component electrically connected in parallel with the switch assembly between the neutral connection and the ground. The transformer protection circuit further includes an overvoltage protection device electrically connected in parallel with the switch assembly and the direct current blocking component; and a direct current sensor device positioned to detect direct current across the overvoltage protection device.

In a third aspect, a method of operating a transformer protection circuit is provided. The method includes detecting existence of an electrical event at a transformer neutral of a power grid transformer capable of causing damage to the power grid transformer. The method also includes, in response to detecting the existence of the electrical event, sending an electrical signal to actuate a switch assembly from a closed position to an open position, the switch assembly being electrically connected between the transformer neutral and a ground, thereby electrically disconnecting a conductive path between the transformer neutral and the ground. The method further includes, while the switch assembly is open, detecting a current indicating an overvoltage event causing electrical discharge across an overvoltage protection device that is electrically connected in parallel with the switch assembly. The method also includes, in response to detecting the overvoltage event, actuating the switch assembly from the open position to the closed position and back to the open position.

DETAILED DESCRIPTION

Figure 1:
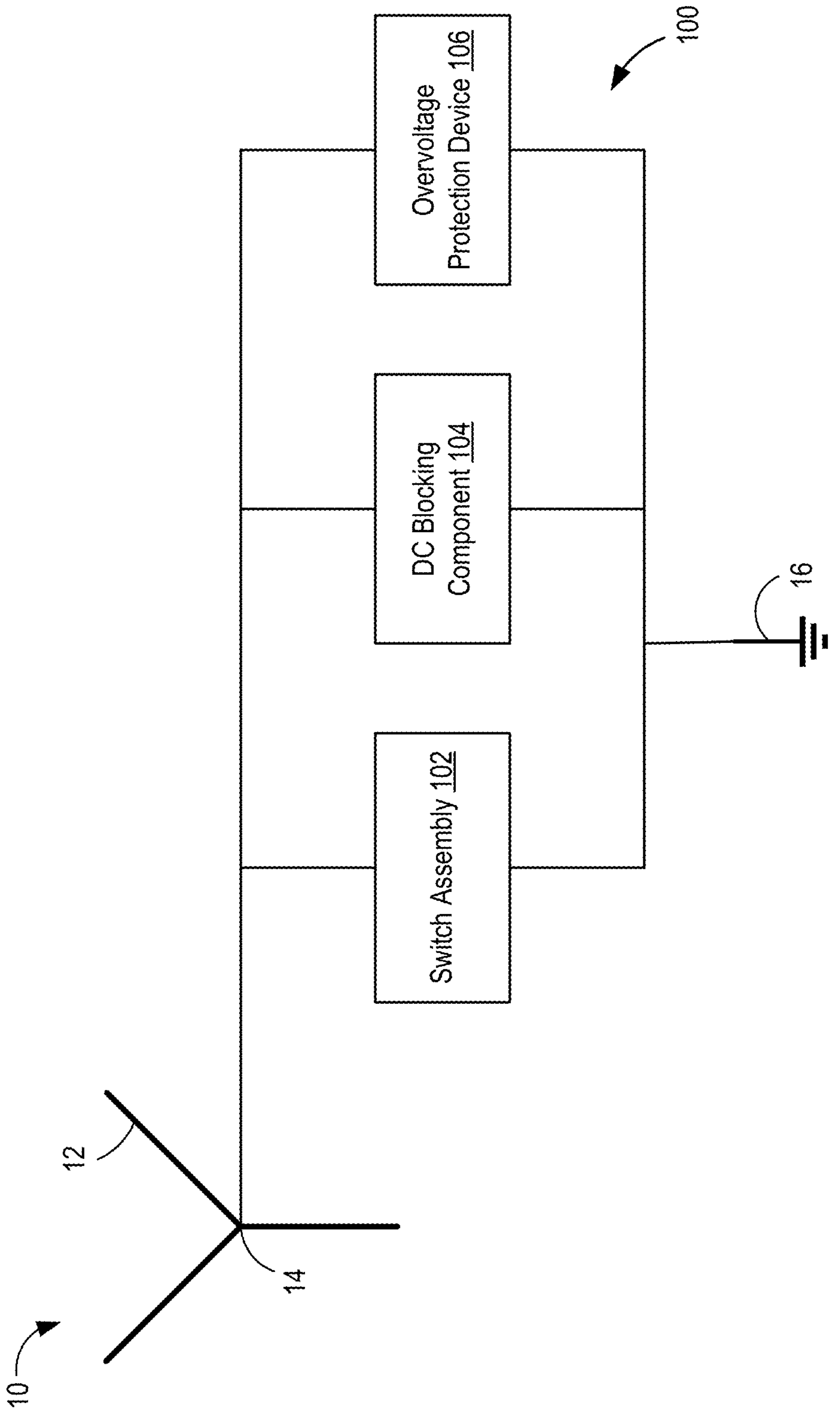
FIG. 1 illustrates a schematic diagram of a protection circuit in which aspects of the present disclosure may be implemented.

Generally speaking, the present application relates to various improvements in protection circuits useable to protect a power grid transformer from damage due to solar storm and HEMP events, a variety of types of potentially damaging events, such as those which may induce current on power line phases, resulting in a voltage at a transformer neutral while the protection circuit is active. Generally speaking, the neutral connection of a multi-phase power transformer may be grounded, but in the event of such induced voltage, a high current may pass from the transformer neutral to ground, resulting in damage to the transformer. Circuits that detect different types of such events, and respond thereto, have been proposed in the past, including in previous filings by the present applicant.

In addition to the challenges outlined above, further issues can arise when placing transformer protection devices in large numbers across a grid. This is due in large part to the rise in neutral DC voltage at each protection device as these transformer protection devices each remove a DC grounding point, thereby increasing the distance between DC grounding points across the grid. This, in essence, increases the length or size of the “antennae” resulting in larger DC voltages from smaller field strengths of HEMP-3 or solar activity. While a transformer protection device has the switch assembly in the open state, DC voltages can rise and approach the setpoint limit of the overvoltage protection device where they either begin to conduct or breakdown/spark over.

Previous solutions, including those by the applicant, have addressed the issue of a slower increase of DC voltage across the neutral as a result of blocking a larger than anticipated solar storm or HEMP-3 event via multiple protection devices across the grid. In such cases it is possible to detect the DC voltage as it approaches the blocking limit of the transformer protection device and utilize that measurement to safely open phase breakers (circuit breakers connected at the phases of the power transformer) without risk of damage (with little to no DC current across them) and de-energize the transformer. This removes the transformer from the circuit to prevent damage, e.g., if DC voltage were to actuate an overvoltage protection device. An example solution to this issue is described in U.S. Pat. No. 11,469,590, the disclosure of which is hereby incorporated by reference in its entirety.

Previous designs have also solved the issue of protecting the transformer from AC over voltages due to AC fault events as a result of line to ground faults or some other cause. These fault events produce large AC current detectable by grid equipment already installed and are not as fast as other transient events. In addition, fault events only require the transformer protection device to provide a path to ground in such events to prevent an over voltage that would otherwise potentially exceed the rating of the neutral insulation of the particular transformer that the protection device is connected to. Fault events are also recorded by equipment already installed across the grid which automatically trip protection relays to clear these faults. In this instance, a large alternating current breaker, typically an SF6 or vacuum breaker, may be positioned between the transformer neutral and ground. Such an AC breaker will, similar to the phase breakers, be able to be actuated in the presence of very high AC current. This high AC current provides “zero crossings” (even in the presence of DC current) which is necessary per their design when breaking AC current. Attempting to operate a phase breaker, or an AC breaker generally, with no zero crossings could result in catastrophic failure of that breaker.

However, there are power system events that are much faster than fault events and do not provide the “zero crossing benefit” of high AC currents or the benefit of time for detection and actuation of the phase breakers. These fast events are over and done before a large phase breaker would have time to operate and when combined with a simultaneous large DC event (i.e. solar storm or HEMP-3) may bypass a protection device's ability to block DC (even with the switch assembly open) resulting in longer term effects and risk of damage to the transformer. These faster events, combined with simultaneous DC events, cannot and should not be handled by phase breakers for risk of permanent damage. A few examples of these particular events would be a HEMP-1 pulse, HEMP-2 pulse, HEMP-3a blast wave, lighting, switching transient, other transient or some other power system event that when combined with a higher DC voltage already across the neutral (as a result of an ongoing solar storm or HEMP-3 event) may result in a sudden and unexpected operation of the overvoltage protection device without the detection of grid equipment. An overvoltage event across the transformer protection device while in the presents of high DC voltage may establish a new path to ground for the underlying DC current through the overvoltage protection device (i.e. in the case of a spark gap, through the arc that is formed). The high DC voltage and current may maintain that arc for a longer period of time, resulting in DC current flowing through the transformer for dangerous periods undetected by both grid equipment and the transformer protection circuit; that is, because the switch assembly is open, protection circuit equipment will believe the DC grounding point is removed. It is therefore desirable for improvements to be made to existing solutions which will require robust designs that can detect the occurrence of these fast events, and take appropriate and immediate corrective action to extinguish newly established DC grounding points and re-open a switch assembly that is configured to break both alternating current (AC) and potentially very high direct current (DC) with high DC voltage without reliance on zero-crossings at a transformer neutral.

To address the challenges presented by AC breakers in the context of a switch assembly at a transformer neutral, the present applicant developed a number of protection circuits that include both an AC breaker and a DC breaker connected in series with each other. The AC breaker protects the DC breaker from overvoltage during some types of events that may exceed a voltage/current limit at which the DC breaker can safely operate. Through various sequencing of actuation of these breakers (e.g., opening the DC breaker to open the AC breaker, then reclosing the DC breaker while maintaining the AC breaker open, among other actuation patterns), the cases of AC and DC current events at the transformer neutral may be addressed; however, this arrangement involves complicated control logic, is bulky (due to size of the AC breaker), and expensive due to increased number of components.

In the present application, improved circuits for power transformer protection are therefore described. In some instances, a single switching element may be used in a switch assembly positioned between the transformer neutral and ground. The single switching element may be a breaker or a switch configured, designed, or rated, to break both alternating current (AC) and direct current (DC). The single switching element may be constructed to not rely on zero-crossings of signals at the transformer neutral (and therefore seen at the single switching element). In some instances, the single switching element may be a direct current switch modified to accommodate large alternating current loads. A DC blocking component, typically in the form of a capacitor or resistor, or network thereof, may be positioned in parallel with the switch element between the transformer neutral and ground. A control system may include a control module that sends commands to open and close the switching element in response to specific signal events that are identified, either within the protection circuit or in proximity to the power transformer.

It is noted that DC breakers are designed for use in direct current systems (rather than AC applications such as power grid applications), and as such, are not designed for use in AC systems, and are not usable in AC systems that experience high voltages. Through modifications to a DC breaker, higher signal levels may be accommodated, while avoiding the requirement of zero crossings. Such zero crossing are illustrated in U.S. Pat. No. 10,985,559, the disclosure of which is hereby incorporated by reference in its entirety.

In example implementations, an overvoltage protection device may also be positioned within a protection circuit. Such an overvoltage protection device may be electrically connected between the transformer neutral and ground, for example in parallel with the switch assembly and the DC blocking component. The overvoltage protection device may be implemented as a spark gap or horn gap, a metal oxide varistor (MOV), a surge arrester, or other device in some examples. There may be multiple overvoltage protection devices positioned in parallel with each other, and may be of the same time or of different types or voltage ratings, to provide redundant protection systems.

In further example implementations, the protection circuit components are implemented in a manner that is resilient to potentially damaging electromagnetic events, such as electromagnetic pulse events or HEMP events, including HEMP-1 ("E1"), HEMP-2 ("E2"), and HEMP-3 ("E3") signal components, including, but not limited to, an E3a blast wave.

In some examples, the protection circuit is configured to detect a current that passes through a portion of the circuit that includes the overvoltage protection device. In this way, overvoltage events, which may result in current passing across the overvoltage protection device, may be detected and responded to. The detection component used in such a protection circuit may include a current transformer or shunt resistor (or some other current measuring device) specifically positioned in series with the overvoltage protection device. Alternatively, the detection component may include the shunt resistor positioned between a circuit connection rejoining all of the parallel portions of the protection circuit (e.g., the switch assembly, DC blocking component, overvoltage protection device, and any other protective devices included therein) and ground.

While in some example implementations, current and/or voltage signals are directly detected using sensors positioned within the protection circuit or adjacent thereto, in other example implementations, such signals may be identified either by direct detection or by inference. This may include, for example, obtaining an inferred signal level at the transformer neutral based on signals carried at the phases, or inferring a signal or absence of a signal in one part of a transformer protection circuit based on a signal (e.g., a current signal) being measured elsewhere within the detection circuit, or from a separate signal sensor in proximity thereto.

In some instances, control methods are also described for use of such a circuit. In one example, the protection circuit may determine that there is sufficient current through the protection circuit that there may be the potential for damage to the power transformer; in such a case, the protection circuit may actuate the switch assembly to an open position, thereby blocking the DC component of any current from passing to ground (essentially, removing the DC grounding point but still allowing the transformer to maintain an AC grounded neutral via a path through the DC blocking component). This may occur, for example, during a solar storm, geomagnetically induced current event, or the like. However, during such a time, other events may also occur, such as electromagnetic pulse events. If an electromagnetic pulse event were to occur, an E1, E2, or E3a blast wave component may cause an overvoltage event to occur, for example causing a spark to form across a spark gap, and causing some current to flow through the transformer neutral to ground. Generally speaking, an E1 pulse is short-lived, so may be unlikely to cause significant damage, because the current induced is relatively short, and the voltage experienced at the transformer neutral is limited by the overvoltage protection device (even when a switch assembly is open). However, the existence of the E1 pulse during a large solar or HEMP-3 event (in which DC voltage is already present) the overvoltage event may establish the spark in which the DC current and voltage would cause it to linger across the overvoltage protection device (due to DC voltage at the time of the E1 event), resulting in a lingering, potentially high DC current level event to be maintained at the spark gap, and resulting in a maintained current path between the transformer neutral and ground across the overvoltage protection device. Accordingly, in some embodiments, a method of operation of a transformer protection circuit is provided in which current across an overvoltage protection device may be detected. If such a current is detected (or if a current lasting longer than a predetermined timeframe is detected), a switch assembly may be actuated to a closed position (thereby extinguishing the DC path to ground through the overvoltage protection device) and returned to an open position, thereby interrupting the DC current that may be occurring. In this way, overvoltage events may be ensured to not inadvertently cause a lingering current path across an overvoltage protection device when circuit paths between the transformer neutral and ground would otherwise be configured to block DC current (e.g., by having an open switch assembly).

Other advantages of the circuits and methods of operation are described below in conjunction with the embodiments described herein.

Referring first to FIG. 1, a schematic diagram of a protection circuit 100 in which aspects of the present disclosure may be implemented is shown. The protection circuit 100 may be electrically connected to a neutral connection 14, such as a neutral bushing, of a power transformer 10.

In the example illustrated, a power transformer 10 may have a plurality of phases 12 (e.g., three phases as illustrated). In other examples, other numbers of phases or constructions of a transformer may be used as well. The power transformer may carry power signals on each of the phases to other power grid components (not shown). The neutral connection 14 of the transformer 10, in many instances, is electrically connected to ground 16. However, in some instances, such as in the case of ground faults, geomagnetically induced currents, and the like, a significant current may be experienced at the neutral connection 14, because induced DC current (caused by induction on the power grid) will be directly connected to ground 16. In such instances, it has been proposed to include a switch assembly, such as switch assembly 102, between the neutral connection 14 and ground 16. Such a switch assembly may be selectively actuated to an open position, thereby blocking a direct current path from the neutral connection 14 to ground 16. An example of such a solution is described in U.S. Pat. No. 8,878,396, entitled "Continuous uninterruptible AC grounding system for power system protection", the disclosure of which is hereby incorporated by reference in its entirety.

In the example shown, the protection circuit 100 includes a DC blocking component 104 electrically connected in parallel with the switch assembly 102. The DC blocking component 104 may include one or more circuit elements capable of blocking or decreasing the amount of direct current passing between the neutral connection 14 and ground 16. For example, the DC blocking component 104 may include one or more capacitors and or resistors, positioned in parallel and/or series. In examples, the DC blocking component 104 comprises one or more capacitors and one or more power resistors usable to block or decrease the amount of direct current flowing through the neutral connection 14.

In the example shown, the protection circuit 100 also includes an overvoltage protection device 106 electrically connected in parallel with the switch assembly 102 and DC blocking component 104. The overvoltage protection device 106 may include one or more devices configured to allow current to pass therethrough when a voltage reaches a predetermined level. In examples, the overvoltage protection device 106 may include a plurality of such devices, such as spark gaps, surge arresters, or combinations there of and the like. An example overvoltage protection device is described in U.S. Pat. No. 9,660,441, the disclosure of which is hereby incorporated by reference in its entirety.

As discussed further in conjunction with the specific embodiments described below, in example implementations, operation of the switch assembly 102 may be affected by conditions detected in proximity to the protection circuit 100, or within the protection circuit. In some instances, a current may be detected passing through the overvoltage protection device 106. Such a current may indicate the existence of an overvoltage event occurring while the switch assembly is in an open position. Either alone, or in combination with other sense conditions, it may be determined that the overvoltage event is lingering at the overvoltage protection device 106 after occurrence of the primary event that caused the overvoltage condition. Accordingly, in some circumstances, the switch assembly 102 may be actuated from an open position to a closed position, and subsequently from the closed position back to the open position. Closing the switch assembly 102 creates a conductive path of less resistance between the neutral connection 14 and ground 16, and allows a current to pass therethrough, thereby ending the overvoltage event. Subsequently opening the switch assembly 102 allows a DC open circuit to be reestablished, with current through the overvoltage protection device 106 being broken. Accordingly, if no further overvoltage condition is experienced at the neutral connection 14, current through the overvoltage protection device is interrupted effectively.

In example embodiments described herein, the switch assembly 102 may be constructed from a single breaker or switch capable of breaking both DC and AC current. Such a switch assembly may be constructed to not require zero-crossings of electrical current at that switch assembly. The single breaker or switch, referred to herein as a single switching element, may be constructed from a DC switch, for example to avoid the size, cost, and complexity of existing AC switch systems. The switch assembly 102 may be implemented by constructing such a DC switch, but having sufficient voltage and current ratings to avoid damage in the event of large magnitude AC or DC events. Such a device may be triggered based on the magnitude of the event, rather than relying on a zero crossing of a signal, which is typical for operation of an AC switch or breaker. An example modification of a DC breaker to accommodate high voltage, high current signals is described in U.S. Provisional Patent Application No. 63/582,376, the disclosure of which is hereby incorporated by reference in its entirety.

When the switch assembly 102 is actuated, generally speaking this will prevent both AC and DC current from passing through the switch assembly 102 between the neutral connection 14 and ground 16. It is noted that AC current may continue to flow between the neutral connection 14 and ground 16 via the path through the DC blocking component 104, and further, AC and/or DC current may pass through the circuit 100 generally when a voltage at the neutral connection 14 is above a breakdown voltage of the overvoltage protection device 106.

Figure 2:
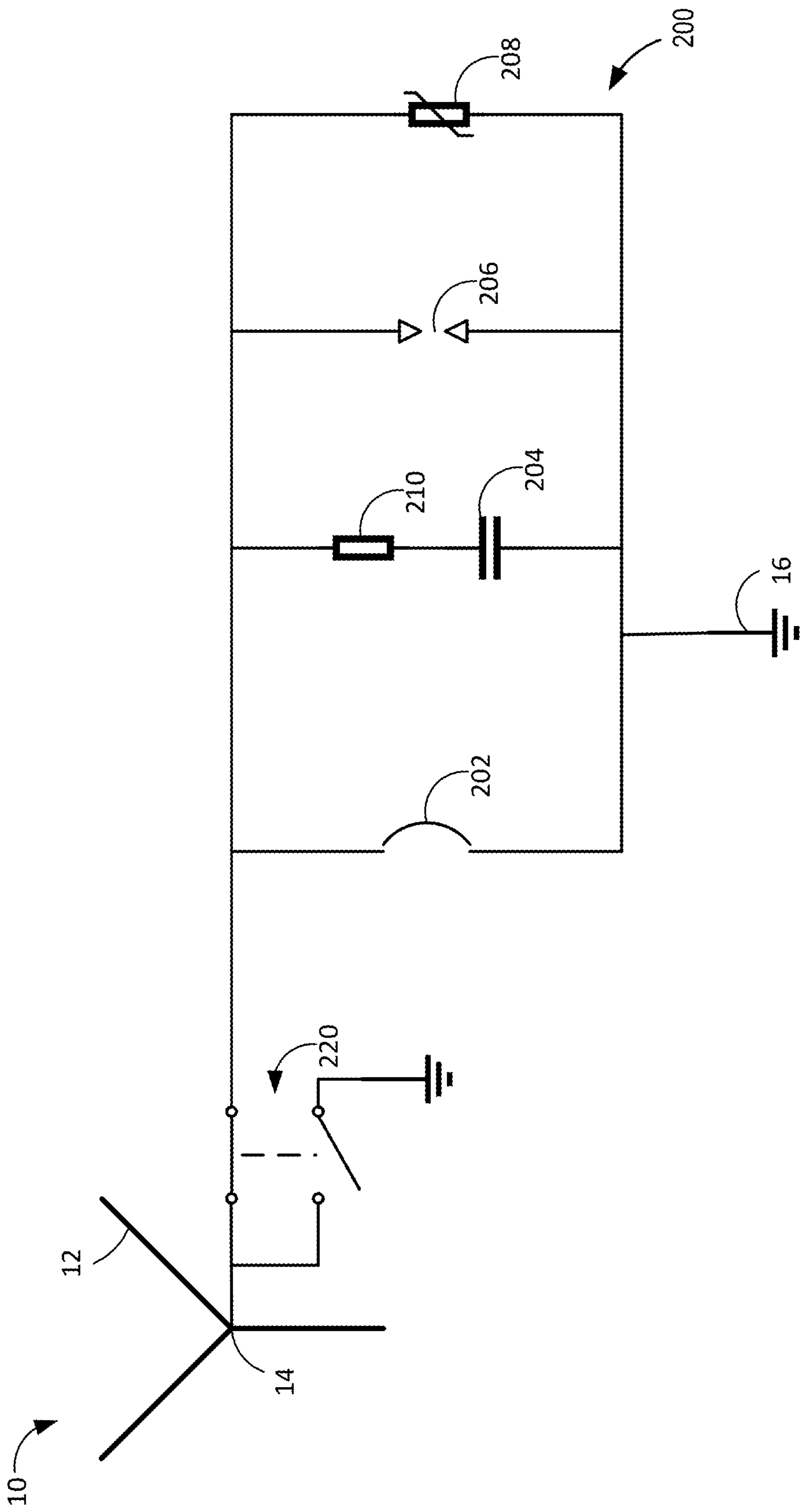
FIG. 2 illustrates a schematic diagram of a transformer protection circuit implementing aspects of the present disclosure.

FIG. 2 illustrates a schematic diagram of a transformer protection circuit 200 implementing aspects of the present disclosure. In the example shown, the transformer protection circuit 200 may be electrically connected between a neutral connection 14 of a transformer 10, and a ground connection 16. In the example shown, the transformer 10 may be a multi-phase power transformer having a plurality of electrical phases 12; in other examples, other numbers of phases or constructions of a transformer may be used as well. In the example shown, the transformer protection circuit 200 includes a switch assembly 202, a DC blocking component 204, and overvoltage protection device 206, and a secondary overvoltage protection device 208.

In example embodiments, the switch assembly 202 is constructed from a single switch capable of breaking both DC and AC current. In example implementations, the switch comprises a DC switch configured to break AC current in a range up to and including 10,000 amps; the switch may be configured such that a zero crossing of an electrical current signal is not required to cause breaking of the circuit, which would otherwise typically be required of an AC switch or breaker.

In particular constructions of the single switch, modifications may be made to a direct current circuit breaker, or switch, to accommodate higher current and voltage loads that are implicated herein. In particular, a direct current circuit breaker has a set of contacts that may be opened and closed to change connectivity of the switch. The contacts are spaced from a surrounding housing (which may be metallic) by a particular distance as well. Additionally, an arc chute may be included in such a breaker, formed from a set of parallel metal plates used to divide and cool an arc that may form within the circuit breaker. In accordance with the present disclosure, a single switching element, or switch, has a widened opening on the contacts to avoid an arc forming across the contacts at high voltage (e.g., above voltage ratings of currently-available DC Switches). Additionally, the single switching element includes an air gap distance (between the contacts and surrounding enclosure, including any other conductive structural components) that is greater than the contact distance, thereby further reducing likelihood of unwanted arcs forming. Finally, a larger arc chute may be included in such a switching element to accommodate higher currents and voltages that may be experienced at the single switching element. Accordingly, the single switch may be constructed as a direct current switch that has a voltage withstand of at least 500 volts DC, and to withstand at least 500 but often greater than 3,000 amps DC. Such signal threshold levels may be greater depending on, e.g., the sizing of contacts and conductors, spacing of the contacts, arc chute, and air gap distance. Other modifications are possible as well, in particular example embodiments.

In examples, the switch is a mechanical switch, but does not automatically actuate in response to identification of AC or DC current. Rather, the switch is actuated via an electronic input (not shown in FIG. 2—described below). Typically, an electronically actuated switch may actuate in response to detection of circuit conditions (e.g. overcurrent or overvoltage events). However, because the transformer protection circuit 200 is configured to identify and respond to events that may otherwise interfere with electronic actuation, the switch included within the switch assembly 202 does not rely on its own electronic sensing and actuation mechanisms. Specifically, in the event of an electromagnetic pulse (EMP) event, damage to unshielded electronic components may be possible, including circuitry used within such electronic switches. As described herein, such circuitry is removed or bypassed in accordance with the present disclosure, and a separate, shielded electronic circuit may be used to transmit actuation signals to the switch assembly 202. By doing so, the switch assembly 202 becomes less vulnerable to damage due to EMP events, and the overall transformer protection circuit has only a single source of sensitivity to such events (a control circuit as described below in conjunction with FIG. 6).

In the example shown, the DC blocking component 204 is illustrated as being implemented using a capacitive device, such as a capacitor bank or other large-scale capacitor capable of maintaining a high voltage differential across capacitive conductive elements (e.g. in the range of 2 to 20 kV). In other examples, the DC blocking component 204 may be constructed from a mixture of capacitive and resistive elements. It may also include multiple DC blocking components in parallel that are in series with a resistor. In the example shown, a power resistor 210 is electrically connected between the neutral connection 14 and the DC blocking component 204. The power resistor 210 may operate to dampen harmonics or resonances experienced at the transformer neutral connection 14 and to avoid blown fuses with the sudden discharge events at the DC blocking component 204. The DC blocking component 204 may also be considered to include, for example, the power resistor 210 as described herein.

In some examples, the DC blocking component 204 may have an adjustable capacity, or withstand, after manufacture. For example, as noted above, the DC blocking component 204 may be constructed from a plurality of capacitive devices connected in parallel with one another. In some examples, a set of 28 4.8 kV capacitors may be used in construction of the DC blocking component. If a greater capacity is desired, additional capacitors may be added, either in parallel or in series, depending on whether overall charge capacity or withstand is desired to be adjusted.

In the example shown, the overvoltage protection device 206 is implemented as a spark gap device capable of forming a current path between the neutral connection 14 and ground 16 after a voltage above a threshold is reached. This causes clipping of the voltage at that threshold, and in some instances reduction of the voltage while maintaining a current across such a device, as described below. As noted above, an example of such an overvoltage protection device 206 is described in U.S. Pat. No. 9,660,441.

In the example shown, the secondary overvoltage protection device 208 may be electrically connected in parallel with the overvoltage protection device 206, the DC blocking component 204, and the switch assembly 202. The secondary overvoltage protection device 208 is implemented, in the embodiment shown, as a surge arrester. The surge arrester may be selected to have a breakdown voltage that is higher than that of the overvoltage protection device 206. Accordingly, the surge arrester may be positioned to act in case of failure of the overvoltage protection device 206. Alternatively, the secondary overvoltage protection device 208 may be selected to have a breakdown voltage that is the same as or lower than that of the overvoltage protection device 206. Selection of relative voltage thresholds are dependent on implementation, but generally are selected such that the threshold voltage at which current is allowed to pass between the neutral connection 14 and the ground 16 is below a potential failure threshold of the transformer 10, and below a potential failure threshold of the DC blocking component 204. The threshold voltage of both the overvoltage protection device 206 and the secondary overvoltage protection device 208 is also set such that a failure threshold of the switch assembly 202 is above that of either device (e.g., that the switch assembly 202 will not fail while in the open position, thereby causing a short circuit between the neutral connection 14 and ground 16).

In the example shown, the transformer protection circuit 200 further includes a manual disconnection switch 220. The manual disconnection switch 220 may selectively connect the neutral connection 14 of the transformer 10 to either the transformer protection circuit 200 or to a ground connection. The manual disconnection switch 220 allows a service technician to disconnect the transformer from the protection circuit, thereby ensuring that the protection circuit 200 has no voltage on it when servicing the protection circuit 200.

Figure 3:
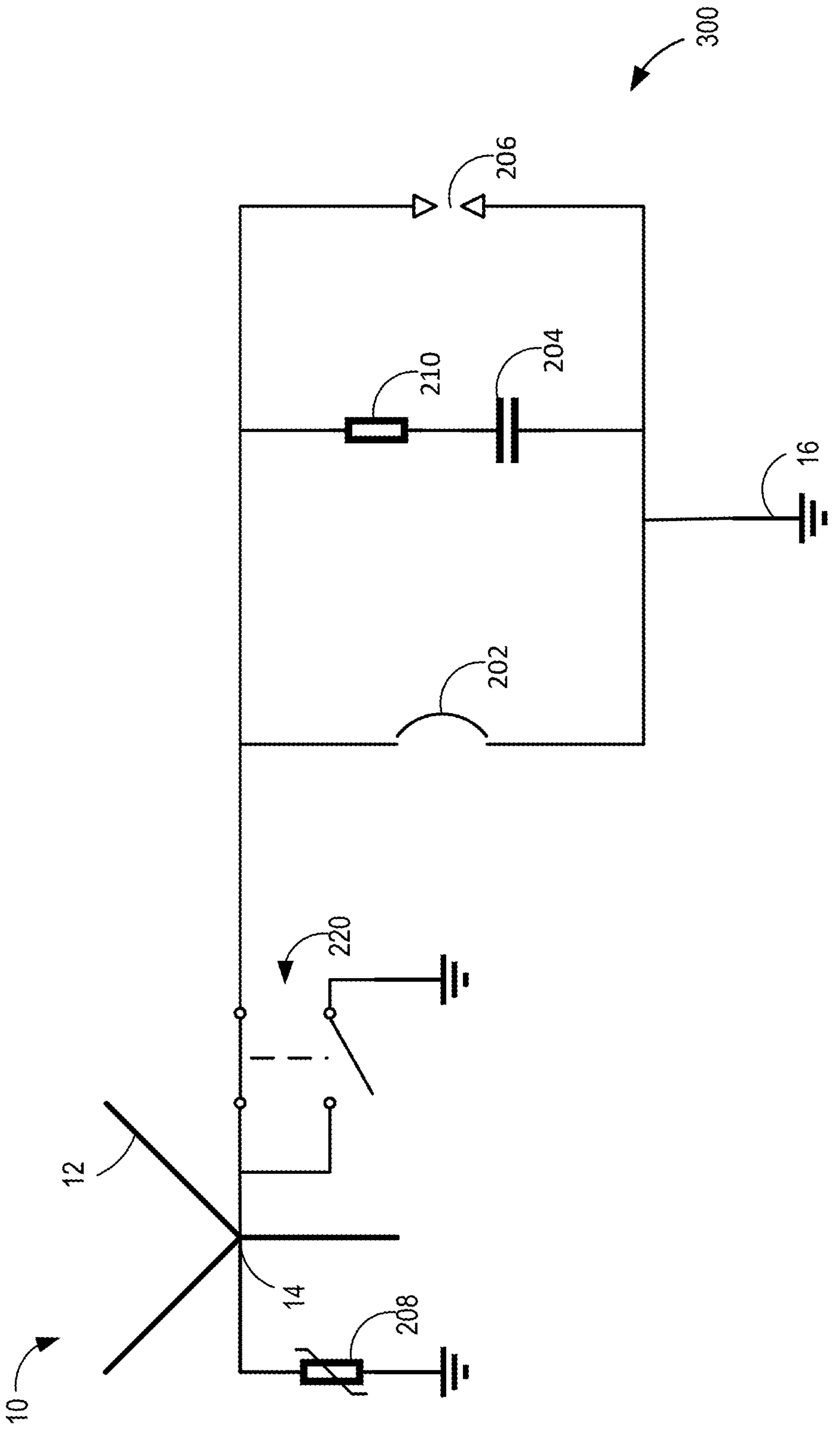
FIG. 3 illustrates a schematic diagram of a transformer protection circuit implementing aspects of the present disclosure, according to an alternative configuration.

FIG. 3 illustrates a schematic diagram of a transformer protection circuit 300 implementing aspects of the present disclosure, according to an alternative configuration. The transformer protection circuit 300 generally corresponds to the analogous circuit shown in FIG. 2, but places the secondary overvoltage protection device 208 physically closer to the transformer neutral connection 14. For example, the secondary overvoltage protection device 208 may be electrically connected and physically positioned proximate to the neutral bushing of transformer 10, and separately grounded. In such an instance, the secondary overvoltage protection device 208 may generally have a breakdown voltage or actuation voltage that is above that of the overvoltage protection device 206.

Figure 4:
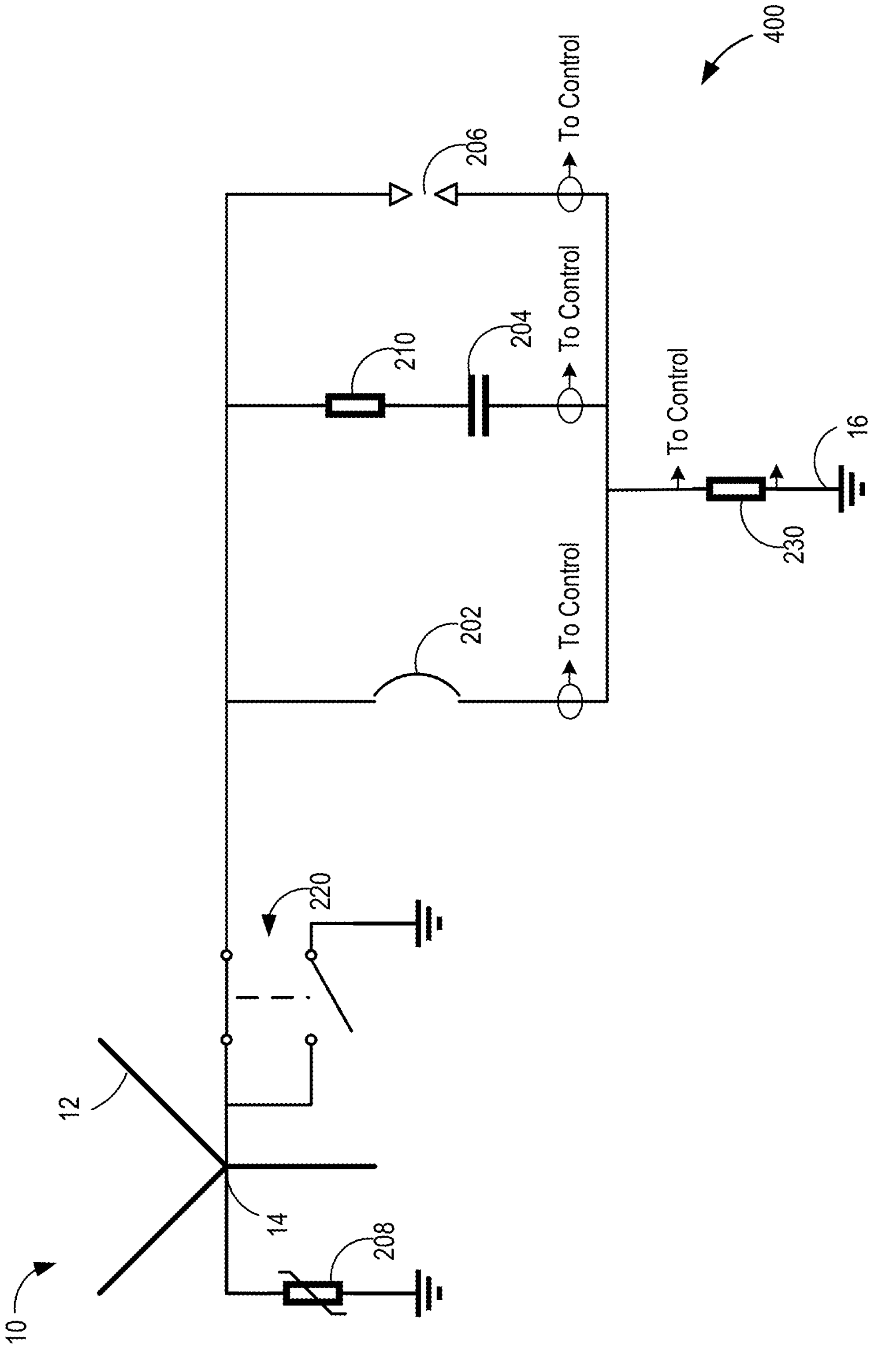
FIG. 4 illustrates a schematic diagram of a transformer protection circuit implementing aspects of the present disclosure, according to a still further alternative configuration.

FIG. 4 illustrates a schematic diagram of a still further transformer protection circuit 400 implementing aspects of the present disclosure. The transformer protection circuit 400 of FIG. 4 generally includes the protection components described previously in conjunction with FIG. 3. However, in addition, control and monitoring components are included within the circuit 400 to illustrate methods of actuating the switch assembly 202 in response to particular sensed conditions.

In particular, the transformer protection circuit 400 includes a current detection component 230 positioned to detect current through at least one of the parallel components included within the transformer protection circuit, namely the switch assembly 202, the DC blocking component 204, and/or the overvoltage protection device 206. In the example embodiment shown, the current detection component 230 comprises a shunt resistor electrically connected between a common voltage point on the ground side of the switch assembly 202, DC blocking component 204, and overvoltage protection device 206, and the ground 16. Voltage levels across the shunt resistor 230 may be used to determine the presence of a direct current or instantaneous AC current passing between the neutral connection 14 and the ground 16. In particular, relative voltage levels may be used to determine a current path of current through the current detection component 230. For example, a low but increasing current may indicate that the switch assembly 202 is in a closed position, with a rising current suggesting, in some cases, that the switch assembly should be opened to avoid transformer damage that might occur by flowing current in a prolonged manner between the neutral connection 14 and the ground 16. A sudden higher current or even the presence of direct current while the switch assembly 202 is open may indicate an overvoltage event causing current to pass through the overvoltage protection device 206. In such instances, a voltage across the current detection component 230 may be higher, or may vary, based on a resistance experienced at the overvoltage protection device 206.

In addition to, or in conjunction with the current detection component 230, one or more current resistors may be located along each dedicated leg of the transformer protection circuit 400. For example, a first current detection device, such as a current transformer configured to detect AC current, may be positioned between the switch assembly 202 and a common connection point at which the parallel legs including the switch assembly 202, DC blocking component 204, and overvoltage protection device 206 are joined. Similarly, a current detection device such as a current transformer may be positioned on the ground side of the DC blocking component 204, as well as on a ground side of the overvoltage protection device 206. Each of these current transformers may measure AC current and transform that current to a lower level and send it to a control circuit, such as the control circuit seen in FIG. 6. The control circuit may take one or more actions, such as actuating the switch assembly 202, transmitting one or more notifications to remote systems, and the like. The control circuit may also receive data, including sensor data, from other systems or devices as described further in conjunction with FIG. 7, below.

Figure 5:
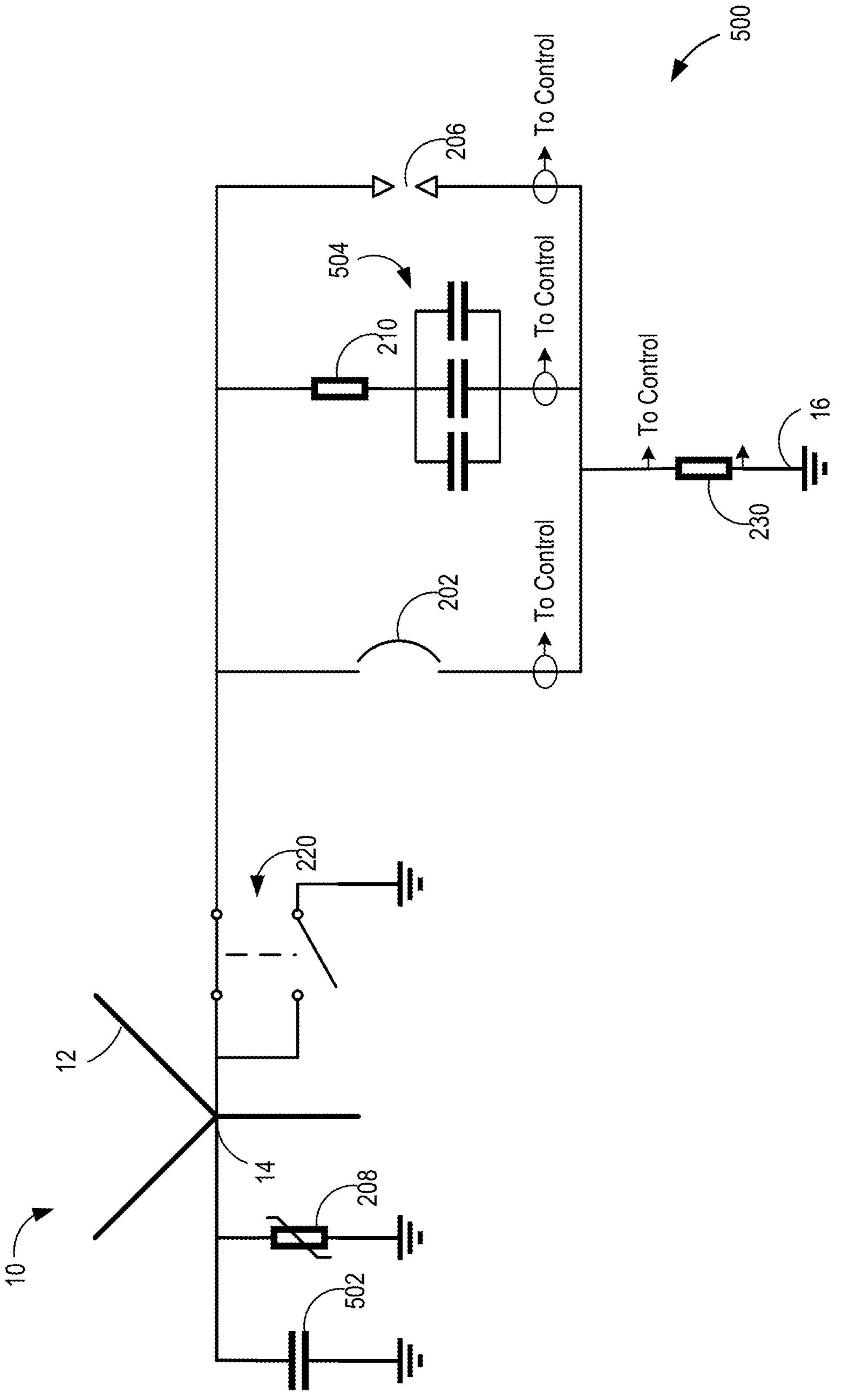
FIG. 5 illustrates a schematic diagram of a transformer protection circuit implementing aspects of the present disclosure, according to a still further alterative configuration.

FIG. 5 illustrates a schematic diagram of a further embodiment of a transformer protection circuit 500. The transformer protection circuit 500 generally corresponds to the transformer protection circuit 400 described previously, but further includes a surge protection device, such as surge capacitor 502, electrically connected in parallel to a DC blocking component 504 between the transformer neutral 14 and ground 16. A surge protection device such as the surge capacitor 502 shunts high frequency transients or other events to ground without providing a path for DC current to flow. A surge capacitor 502 or similar device is connected within the transformer protection circuit 500, for example directly to the transformer 10 close to the neutral 14 electrically connected in parallel to the DC blocking component (near the surge arrester 208) or alternatively between the manual disconnect switch 220 and ground 16. There may be other connection locations as well that place the surge protection device 502 in parallel with the DC blocking component 504. The surge capacitor 502 has a generally higher impedance at 60 Hz (e.g., typically above 10 Ohms) than the DC blocking component 504 as shown, which has a low impedance at 60 Hz. When a high frequency surge occurs, the surge capacitor 502 acts as a short to ground thereby lowering the intensity of the surge or "spike" in voltage which may help prevent the risk of the overvoltage protection device from operating when the switch assembly is open and DC voltage is already present. If the surge is a high frequency transient the surge capacitor will short it to ground. If the surge has a lower frequency, the capacitor will not short it to ground and a high voltage "spike" may cause the overvoltage protection device to operate. A surge protection device of various impedances can be used. Typically it will be important that the impedance of the surge capacitor (or similar device) at 60 Hz is higher than the impedance of the DC blocking component at 60 Hz.

Additionally, as shown the DC blocking component 504 is illustrated explicitly as a plurality of parallel capacitive elements. The DC blocking component 504 may be used in place of DC blocking component 204 of others of FIGS. 2-6 herein, which are depicted as a single capacitive element for simplicity of illustration. The DC blocking component 504 will generally have a lower impedance than the surge capacitor at 60 Hz, typically in a range of a few ohms (e.g., 0.5-10 ohms).

Figure 6:
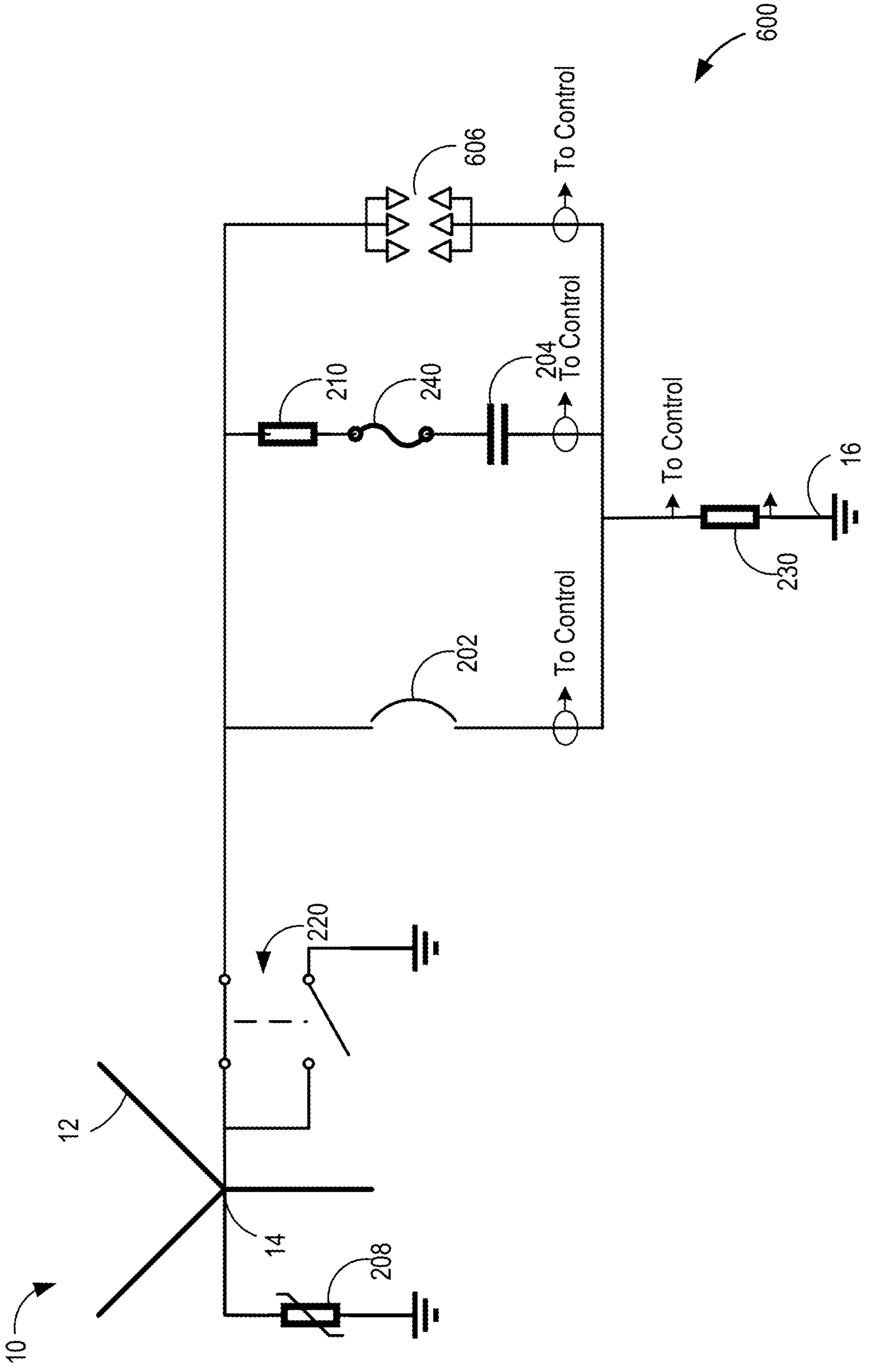
FIG. 6 illustrates a schematic diagram of a transformer protection circuit implementing aspects of the present disclosure, according to a still further alternative configuration.

FIG. 6 illustrates a schematic diagram of a further embodiment of a transformer protection circuit 600. The transformer protection circuit 600 generally corresponds to the transformer protection circuit 500 described previously, but further includes a fuse 240 electrically connected between the power resister 210 and the DC blocking component 204. In such an arrangement, the DC blocking component 204 may be considered externally fused, such that a current above a predetermined threshold at the fuse 240 may cause an open circuit to form, such that neither direct-current nor alternating current may pass through the portion of the transformer protection circuit 600 that includes the DC blocking component 204. Although in the example shown, a single fuse is illustrated, it is recognized that one or more fuses may be positioned within the circuit. Furthermore, although the fuse 240 is illustrated as being positioned between the power resistor 210 and the DC blocking component 204, it may be positioned between the power resistor 210 and the transformer neutral connection 14. Other arrangements are possible as well, as well as other variance on the transformer protection circuit as described herein.

Additionally, in this example, an overvoltage protection device 606 is shown. The overvoltage protection device 606 generally corresponds to the overvoltage protection device 206, but explicitly illustrates that a plurality of spark gaps may be arranged in parallel. This arrangement provides redundancy to ensure that a particular breakdown voltage may be reliably and repeatably met. Such a redundant arrangement of spark gaps is contemplated in U.S. Pat. No. 9,660,441, and is useable in each of the transformer protection circuits described herein, including those of FIGS. 2-5.

Figure 7:
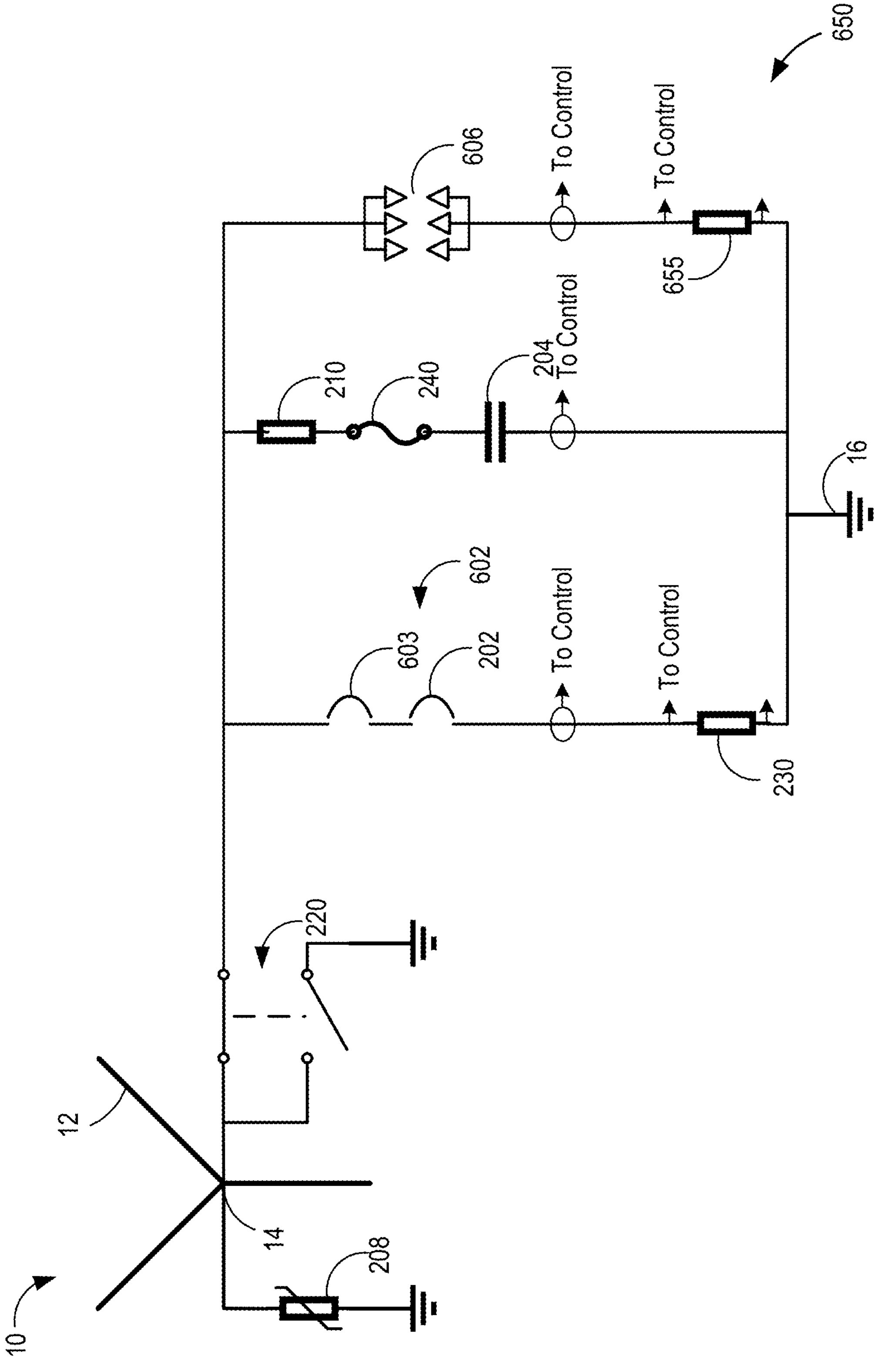
FIG. 7 illustrates a schematic diagram of a transformer protection circuit implementing aspects of the present disclosure, according to a still further alternative configuration.

FIG. 7 illustrates a still further transformer protection circuit 650, in which aspects of the present application may be implemented. In this example, the detection of current passing through the overvoltage protection device 606 may be performed in association with a switch array 602 that includes the switch assembly 202 formed from a single switching element (e.g., a DC switch), as well as one or more other switches 603. The other switches 603 may be DC switches, AC switches, or some combination thereof. As such, the switch array 602 may form an example of a switch assembly that includes two or more switches. The switch array 602 may be used in place of the switch assemblies 202 of FIGS. 2-6, in some examples.

The overall operation of the circuit of FIG. 7 generally is analogous to that described above in conjunction with FIG. 6; the operation of the switches 202, 603 may generally involve a combination of switching events to quickly open the switch assembly 202 in the event of large DC current, followed by opening of switch 603; switch assembly 202 may then reclose and rely on the switch 603 (which may, in some instances, have a higher withstand value) remaining open to disconnect the transformer neutral 14 from ground 16.

In the example shown, the transformer protection circuit 650 also includes a separate shunt resistor 655 that is connected in series with the overvoltage protection device 606. This allows for further separate sensing of current levels across the overvoltage protection device, independent of the shunt resistor 230. In this arrangement, the shunt resistor 230 may be positioned in a portion of the circuit in series with the switch assembly 602. In alternative arrangements, the shunt resistor 230 may remain at a common circuit area in series with each of the switch assembly 602, the DC blocking component (including the capacitors 204 and power resistor 210), and the overvoltage protection deice 606.

Figure 8:
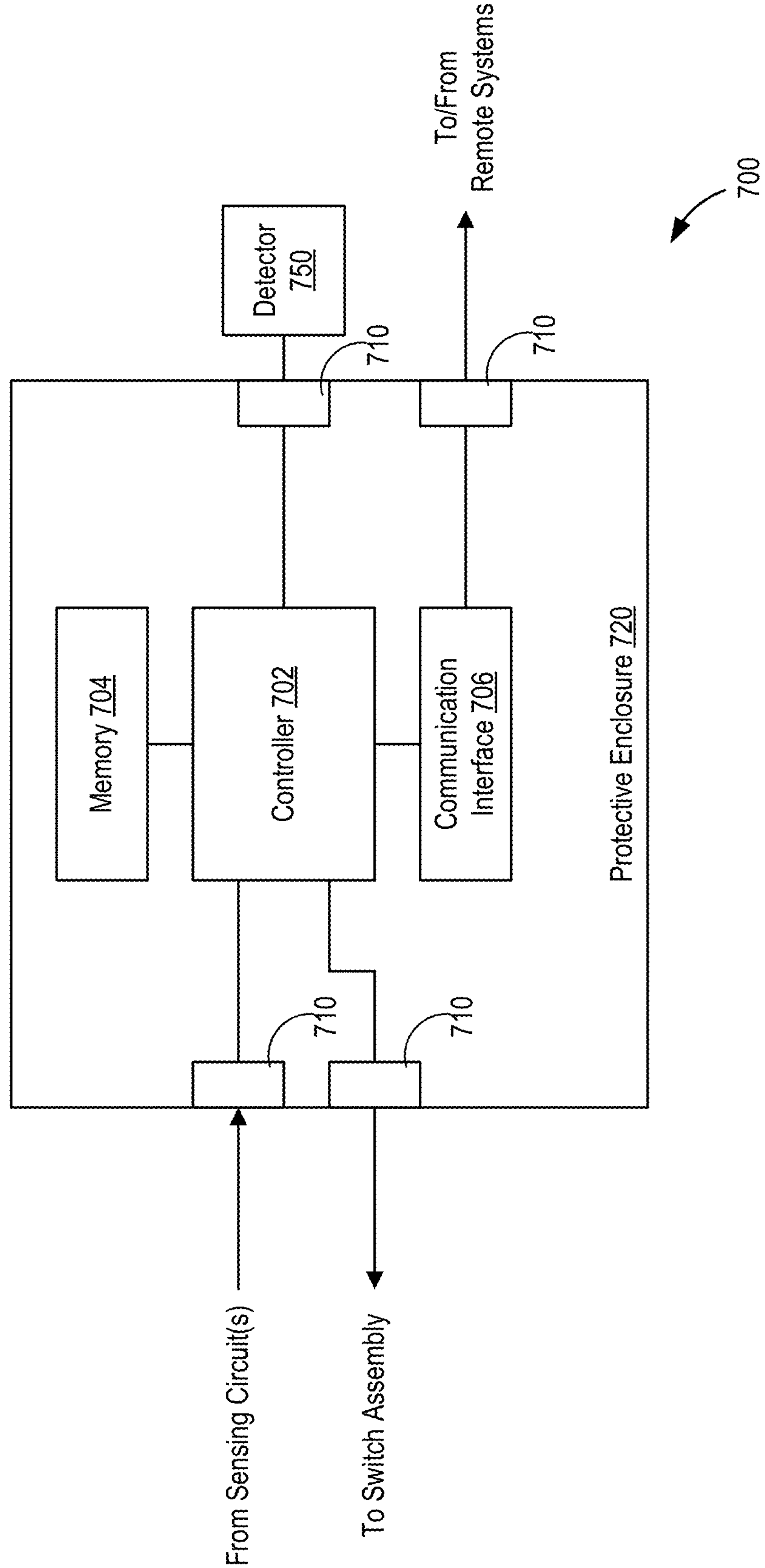
FIG. 8 is a block diagram of a control circuit usable to sense occurrences in the transformer protection circuit of FIGS. 1-7 and actuate a switching assembly or communicate messages in response thereto, according to an example embodiment.

FIG. 8 is a block diagram of a control circuit 700 usable to sense occurrences in the transformer protection circuit of FIGS. 1-6 and actuate a switching assembly or communicate messages in response thereto, according to an example embodiment. In the example shown, the control circuit 700 includes a controller 702 operatively connected to a memory 704 and communication interface 706.

In the example shown, the controller 702 is a programmable circuit configured to execute instructions stored in the memory. In example embodiments, the controller 702 is either a special-purpose or general-purpose processing circuit, such as a CPU. The memory 704 can include one or more memory and/or storage devices. Memory may include nonvolatile memory, such as read-only memory ("ROM"), random access memory ("RAM"), EEPROM, flash memory, or other memory technology. Those of ordinary skill in the art and others will recognize that memory 704 typically stores data or program modules that are immediately accessible to or currently being operated on by the controller 702. Such storage devices may include volatile or nonvolatile, removable or non-removable storage, implemented using any technology capable of storing information such as, but not limited to, a hard drive, solid state drive, CD-ROM, DVD, or other disk storage, magnetic tape, magnetic disk storage, or the like. As used herein, the term "computer-readable medium" includes volatile and nonvolatile and removable and non-removable media implemented in any method or technology capable of storing information, such as computer-readable instructions, data structures, program modules, or other data.

In the example shown, the communication interface 706 may include one or more components for communicating with other devices over a network. Embodiments of the present disclosure may access basic services that utilize the communication interface 706 to perform communications using common network protocols. The communication interface 706 may also include a wireless network interface configured to communicate via one or more wireless communication protocols, such as WiFi, 2G, 3G, 4G, 5G, LTE, WiMAX, Bluetooth, or the like.

In example implementations, the controller 702, memory 704, and communication interface 706 are positioned within a protective enclosure 720. The protective enclosure 720 may be an electromagnetically protected enclosure constructed to shield the components positioned within it from potentially harmful electromagnetic signals experienced within an environment proximate to the enclosure. For example, the protective enclosure 720 may provide protection against electromagnetic pulse events that may induce damaging current and voltage on electronic components. An example of such an enclosure is described in U.S. Pat. No. 8,642,900, and in U.S. Pat. No. 8,537,508, the disclosures of which are hereby incorporated by reference in their entireties.

In the example implementations, the controller 702 may communicate with one or more sensors, such as the current sensing signals described previously in conjunction with FIGS. 2-7. In such instances, electrical signal lines connecting between sensors and the controller 702 may connect through the protective enclosure 720 at one or more filters 710. The one or more filters 710, also referred to herein as signal line filters, are positioned along the inner periphery of the shielded enclosure, and are configured to prevent high frequency, high power electromagnetic signals from entering the shielded enclosure and potentially damaging electrical components positioned therein.

The one or more filters 710 may also be positioned to provide shielding around communication lines leading to remote systems, such as communication lines between communication interface 706 and remote systems.

Additionally, in some implementations, an electromagnetic signal detector 750 may be communicatively connected to the controller 702. The electromagnetic signal detector 750 may be configured to detect potentially damaging electromagnetic field events in proximity to the protective enclosure 720, which may cause the controller to actuate the switch assembly 102, 202 described above in conjunction with FIGS. 1-6. An example of such an electromagnetic signal detector 750 is described in U.S. Pat. No. 8,860,402, the disclosure of which is hereby incorporated by reference in its entirety.

Figure 9:
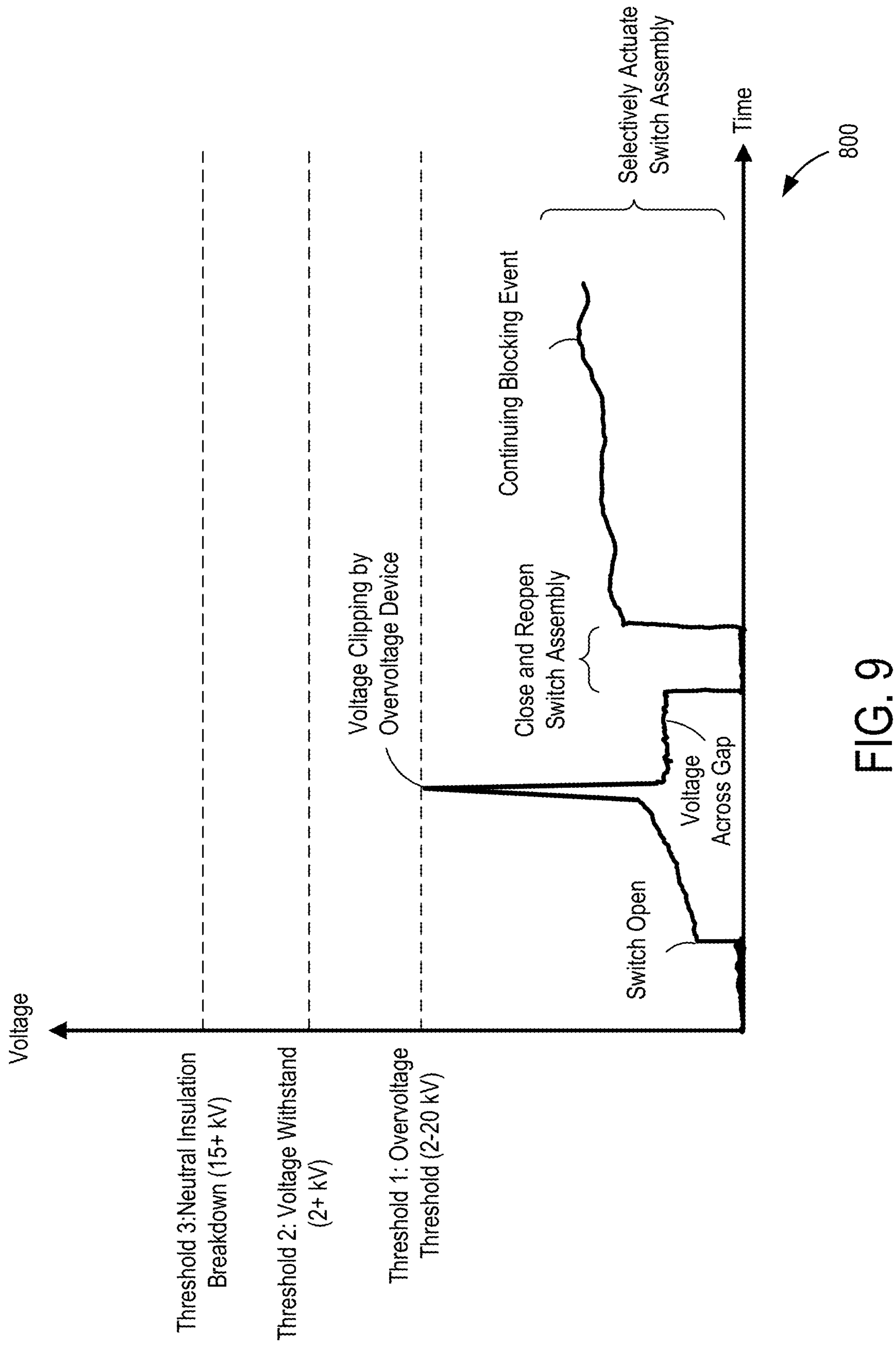
FIG. 9 is a voltage waveform illustrating example operation of a transformer protection circuit according to an example implementation.
Figure 10:
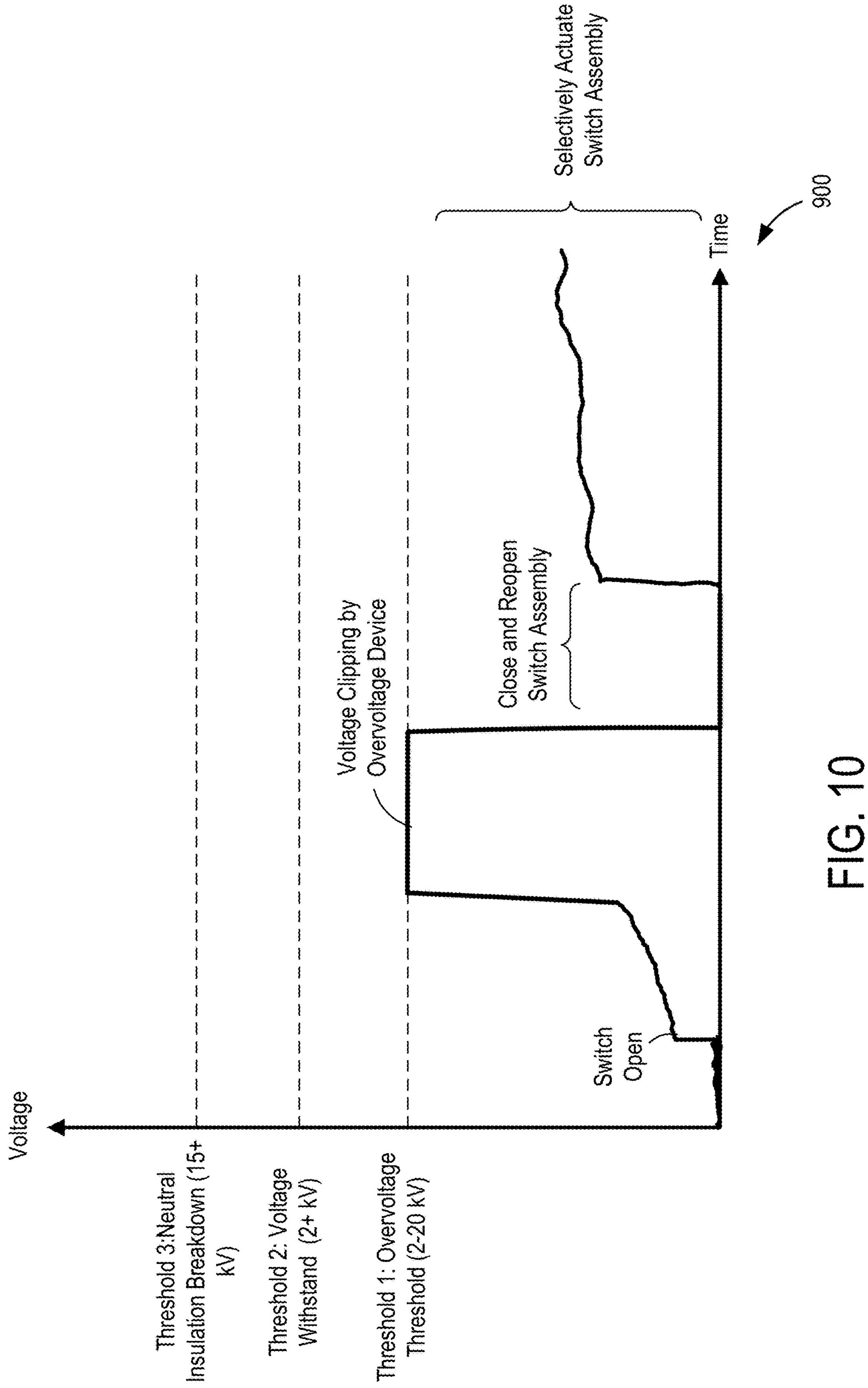
FIG. 10 is a voltage waveform illustrating example operation of a transformer protection circuit according to an example implementation.
Figure 11:
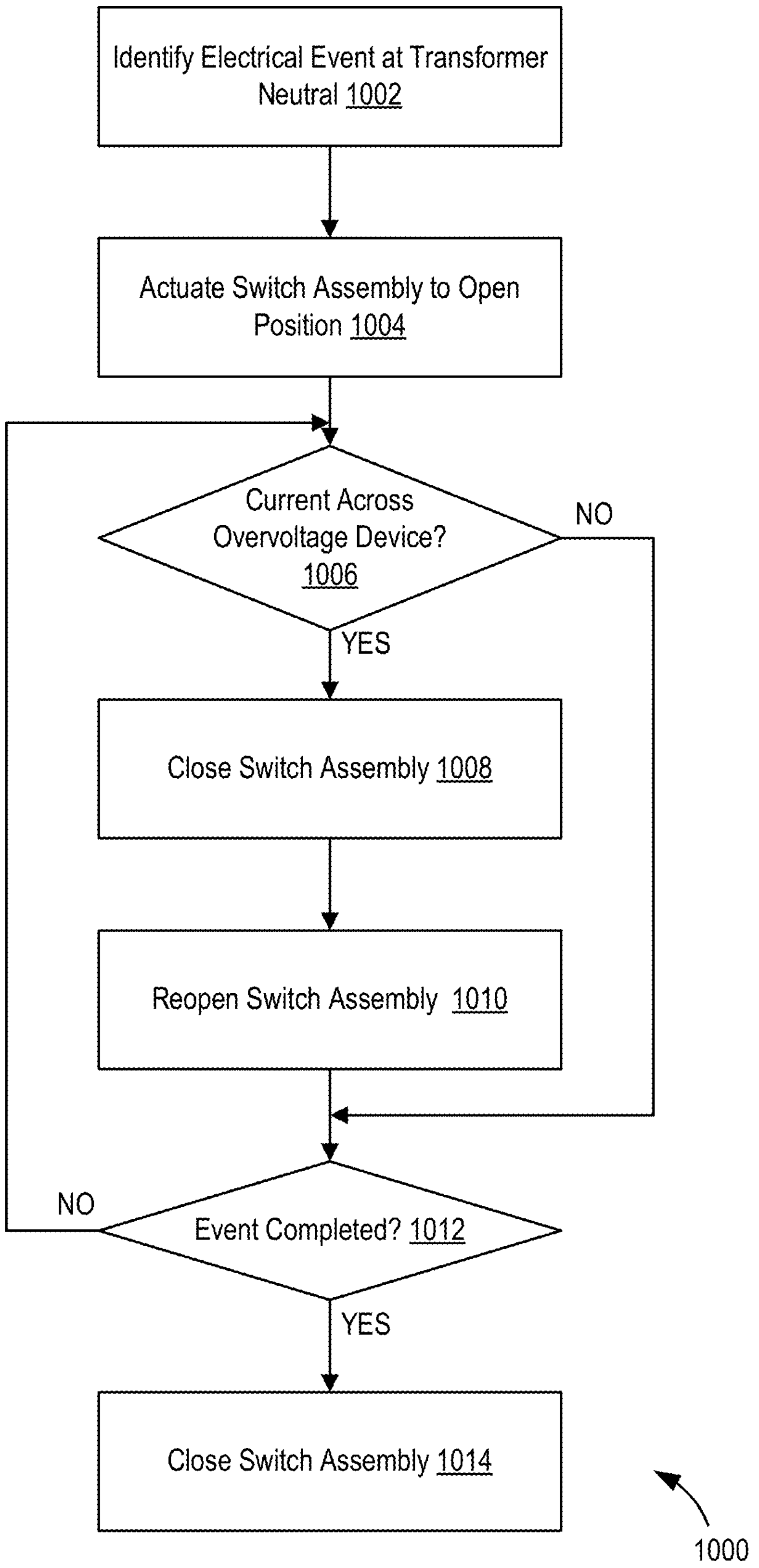
FIG. 11 is a flowchart of a method of operation of a transformer protection circuit in the event of an electromagnetic field event occurring while a switch assembly is positioned in an open position, according to an example embodiment.

Referring to FIGS. 9-11, particular operating characteristics of a transformer protection circuit and methods of operation of such a circuit via a control system are described. In particular, and as noted herein, in typical situations, the transformer protection circuits will operate by maintaining a switch assembly in a closed position. When direct current above a predetermined threshold is detected at the neutral connection of the transformer 10, or other potential indications of significant, potential damaging effects are detected, the switch assembly may be moved from the closed position to an open position. In the open position, the switch assembly will disconnect a neutral connection of the transformer from a ground connection therethrough. A DC blocking component in parallel will prevent or reduce DC current passing from the transformer neutral to ground, while allowing AC current at the transformer neutral.

FIGS. 9-10 illustrates possible voltage levels detected across the overvoltage protection device of example embodiments described herein, when the switch assembly is positioned in the open position. In these examples, the protection circuit is designed in accordance with a series of thresholds. In particular, a first threshold, shown as Threshold 1, corresponds to a breakdown voltage of an overvoltage protection device. Such a threshold may be set at a voltage in the range of 2 to 20 kV. In some instances, this voltage may be set at a threshold level in a range of 4 to 10 kV. Other thresholds, or ranges, are possible as well.

A second threshold, shown as Threshold 2, corresponds to a voltage withstand threshold, and is generally higher than the overvoltage threshold and above 2 kV. For example, where the overvoltage protection device actuation threshold is at or below 10 kV, Threshold 2 could be above such a threshold, e.g., above 10 kV. This voltage withstand threshold may be a voltage rating of the switch assembly, indicating that the overvoltage protection device will prevent voltages at the transformer neutral from reaching a level at which an arc could form across the open switch and damage to the switch assembly would likely occur. A third threshold, shown as Threshold 3, corresponds to a potential failure voltage of the transformer 10, in particular the breakdown voltage rating of insulation associated with the neutral connection 14 of the transformer 10. As such, both the overvoltage protection device and the switch assembly would limit voltage before potential damage to the transformer due to potentially dangerous voltage and/or current at the transformer neutral may occur.

FIG. 9 illustrates a waveform 800 that depicts what may occur generally when the overvoltage device having a lowest breakdown voltage within a transformer protection circuit comprises a spark gap device, such as illustrated in FIGS. 2-7. In this example, during an initial solar storm or HEMP event. A voltage remains low as the switch assembly is closed and there is a solid metallic path to ground. DC current is present and is monitored within the transformed protection circuit. For example, current may be measured across a current detection element, such as the shunt resistor seen in FIG. 5. Once a current is detected that might indicate a potential damaging event at the transformer neutral, a switch assembly may open, removing the DC path to ground causing the DC voltage to rise at the neutral connection 14 of the transformer. As the solar storm or HEMP event intensifies the DC voltage continues to rise. At some point a fast transient event occurs which spikes the voltage to the breakdown voltage threshold of the spark gap. Once the first threshold is reached, a spark may form across a spark gap that is used as the overvoltage protection device. This will cause a current to flow between the neutral connection 14 and the ground 16. In instances where the overvoltage protection device is a spark gap, the voltage will typically drop shortly after an initial spark occurs. This is because the voltage required to maintain a spark within the spark gap is lower than that required to initiate the spark. The fast transient event is over but the spark or arc is maintained by the underlying voltage of the ongoing solar storm/HEMP event providing a DC current path to ground across that arc. Accordingly, when an overvoltage event occurs, it may be the case that a lingering spark across the spark gap results in continued current flowing through the overvoltage protection device, at a voltage below Threshold 1. This is seen in FIG. 8, where, following a voltage breakdown event, a current may continue to flow.

In such instances, and in accordance with the present disclosure, the control circuit that is connected to sense events within the transformer protection circuit may detect a current across the overvoltage protection device. This may be based on, for example, a current transformer measuring AC imbalance current on the portion of the transformer protection circuit where the overvoltage protection device is located. It may also be based on detected DC current at a current detection component 230, such as the shunt resistor described above. In such instances, where current remains flowing through the overvoltage protection device between the neutral connection 14 and the ground 16, the control circuit may actuate the switch assembly of a corresponding transformer protection circuit to a closed position, thereby forming a lower resistance path to ground and extinguishing the spark across the overvoltage protection device. Once the spark is extinguished, the control circuit may actuate the switch assembly to reopen once again removing the DC current path to ground, depending on then-current conditions experienced at the transformer protection circuit. The switch assembly, in this instance, may include a single switching element, or may include two or more switching elements, as illustrated above.

In some instances, the lingering current across an overvoltage protection device such as a spark gap will last longer than the underlying event causing the overvoltage. In such instances, in some cases the control circuit may actuate the switch assembly to close and remain closed, returning to normal operation. In other instances, the control circuit may actuate the switch assembly to close and then toggle to be reopened. Once reopened, the control circuit may determine an appropriate time to re-close the switch assembly and return to normal operation. This may be the case if a single switching element is used in the switch assembly, or if multiple switches are used in the switch assembly. In the case of multiple switches, when the switch assembly is retained in an open position, optionally a direct current switch may be maintained in a closed position while an alternating current switch may be maintained in an open position.

FIG. 10 is a voltage waveform 900 illustrating example operation of a transformer protection circuit according to an example implementation. In this instance, the transformer protection circuit may utilize a surge arrester rather than a spark gap. Accordingly, in the event of an overvoltage occurrence, rather than a spark which causes drop of voltage, clipping of the overvoltage may occur. In this instance, current may pass between the neutral connection 14 of the transformer 10 and to the ground 16 while a voltage drop between the neutral connection 14 the ground 16 remains at the first threshold. Similarly to the above, the control circuit may be configured to close the switch assembly to halt the overvoltage event moving the current from across the overvoltage protection device to the closed switch assembly path to ground, and may optionally reopen the switch assembly to determine whether an event causing the switch assembly to be opened originally remains in place, or whether normal operation may be resumed. This may be the case if a single switching element is used in the switch assembly, or if multiple switches are used in the switch assembly. In the case of multiple switches, when the switch assembly is retained in an open position, optionally a direct current switch may be maintained in a closed position while an alternating current switch may be maintained in an open position.

FIG. 11 is a flowchart of a method 1000 of operation of a transformer protection circuit in the event of an electromagnetic field event occurring while a switch assembly is positioned in an open position, according to an example embodiment. The method 1000 may be performed using the control circuit described above in conjunction with FIG. 7, optionally in conjunction with any of the transformer protection circuits described herein.

In the example shown, the method 1000 includes identifying an electrical event at a neutral connection of the transformer (e.g., neutral connection 14) (step 1002). Identifying the electrical event at the neutral connection may include, for example, determining a current above a threshold, or other detection of potential damaging events that the transformer. The method may further include actuating the switch assembly of a transformer protection circuit to an open position, from a closed position, to interrupt current flow between the neutral connection 14 of the transformer 10 and the ground 16 (step 1004).

In the example shown, the method 1000 may include detecting a DC current across an overvoltage protection device (operation 1006). Detecting a DC current across the overvoltage protection device may include detecting AC imbalance current at a current transformer positioned within the transformer protection circuit on a same parallel leg as the overvoltage protection device indicating a spark occurred and inferring that DC current is also flowing; it may also or alternatively include detecting DC currents directly at a DC current detection device, such as the shunt resistor described above.

If DC current is flowing through the overvoltage protection device, this indicates an overvoltage event occurring while the switch assembly is in the open position. Accordingly, at some time after the current is detected (e.g., either immediately or at some time delay thereafter), the method 1000 includes closing the switch assembly (step 1008), followed by reopening the switch assembly (step 1010). An event assessment is performed (at operation 1012) to determine whether the conditions remain within the transformer protection circuit causing the switch assembly to be actuated to the open position, and determining whether the overvoltage protection event remains. If the event is not yet complete, operational flow returns to reassess the continuing DC current across the overvoltage protection device, and optionally re-attempting opening and closing of the switch assembly to interrupt the current flowing due to the overvoltage event. If the event has completed, operational flow proceeds to allow the control circuits to close the switch assembly, thereby returning to normal operation (step 1014).

Additionally, and referring back to operation 1006, if no DC current is detected across the overvoltage protection device, operational flow proceeds without closing and opening the switch assembly to determine whether a potentially damaging event has completed at operation 1012. As such, a switch assembly may be maintained in an open position during potentially damaging electrical events (e.g., solar storms, geomagnetically induced currents, and the like) and during that time switching of the switch assembly from open to closed to reopen occurs only in instances to attempt to break a lingering current experienced across an overvoltage protection device within the transformer protection circuit. Such an arrangement maximizes the time during which the transfer protection circuit may remain in a protective (open) mode and reduces the extent to which lingering current may remain within the transformer protection circuit across such overvoltage protection devices.

Referring to FIGS. 1-11 generally, it is noted that the protection systems and circuits described herein have a number of differences and advantages in operation. For example, direct current across an overvoltage protection device may be specifically sensed, indicating the presence of an overvoltage event, and allowing a control system to take potential remedial action to discharge the overvoltage protection device (e.g. extinguish the newly established DC current path to ground). Furthermore, the switch assembly as constructed is not automatically actuated by itself at a particular signal threshold, but instead requires deliberate, separate actuation by a control system. Additionally, the protection circuit does not include any other automatically actuated switching elements, for example to disconnect the direct current blocking component, overvoltage protection device, or other circuit elements. This ensures that alternating current paths remain in place between the transformer neutral and the ground through various operating conditions.

EXAMPLES

In accordance with the present disclosure, the below examples represent aspects of the invention.

In Example 1, a transformer protection system includes: a protection circuit electrically connectable between a neutral connection of a power grid transformer and a ground, the protection circuit comprising: a single switching element electrically connected between the neutral connection of the power grid transformer and the ground, the single switching element movable between an open position and a closed position, and being configured to break alternating current (AC) and direct current (DC) from passing therethrough between the neutral connection and the ground without reliance on a zero-crossing of electrical current at the single switching element; a direct current blocking component electrically connected in parallel with the single switching element between the neutral connection and the ground; and a control system electrically connected to a control input of the single switching element, the control system being electrically connected to one or more sensors associated with the protection circuit to identify electrical events at the transformer neutral and, in response, actuate the single switching element between the open position and the closed position.

In Example 2, the transformer protection system of Example 1 is provided, wherein while the single switching element is closed, AC current has two or more paths to ground through the protection circuit.

In Example 3, the transformer protection system of Examples 1-2 is provided, wherein the single switching element is a direct current switch, and wherein the direct current switch has a voltage withstand of at least 500 volts DC. In any of Examples 1-3, the single switching element may be a direct current switch.

In Example 4, the transformer protection system of Examples 1-3 is provided, wherein the single switching element has a default position and an actuated position, the default position being a closed position and the actuated position being an open position, and wherein the control system is configured to actuate the single switching element from the closed position to the open position in response to identification of an electrical event that is capable of causing damage to the power grid transformer.

In Example 5, the transformer protection system of Examples 1-4 is provided, wherein the control system is configured to: in response to presence of an electromagnetic pulse event, entering a mode in which the default position corresponds to the open position.

In Example 6, the transformer protection system of Examples 1-5 is provided, wherein the control system is configured to: in response to presence of a direct current signal above a threshold current level and an alternating current signal below 3000 amps, actuate the single switching element to the open position.

In Example 7, the transformer protection system of Examples 1-6 is provided, further including an overvoltage protection device electrically connected in parallel with the single switching element and the direct current blocking component.

In Example 8, the transformer protection system of Example 7 is provided, wherein the protection circuit forms a first parallel path between the transformer neutral and ground across the single switching element, a second parallel path between the transformer neutral and ground across the DC blocking component, and a third parallel path between the transformer neutral and ground across the overvoltage protection device, and wherein no automatic switch is placed along the second or third parallel paths.

In Example 9, the transformer protection system of Example 7 is provided, wherein one of the sensors is a direct current (DC) detection device electrically connected in a position to detect direct current (DC) across the overvoltage protection device.

In Example 10, the transformer protection system of Example 9 is provided, where the direct current (DC) detection device comprises a shunt resistor.

In Example 11, the transformer protection system of Example 9 is provided, wherein the control system is further configured to: while the single switching element is open, detect at the direct current (DC) detection device a direct current indicating an overvoltage event causing electrical discharge across the overvoltage protection device; in response to detecting the overvoltage event, actuate the single switching element from the open position to the closed position and back to the open position.

In Example 12, the transformer protection system of Example 9 is provided, wherein an overvoltage event occurs across the overvoltage protection device at a voltage threshold that is below a direct current (DC) voltage withstand of the single switching element.

In Example 13, the transformer protection system of Example 7 is provided, further including a plurality of overvoltage protection devices electrically connected in parallel with each other.

In Example 14, the transformer protection system of any preceding example is provided, wherein the control system is configured to: detect existence of an electrical event at the neutral connection that is capable of causing damage to the power grid transformer; in response to detecting the existence of the electrical event, send an electrical signal to actuate the single switching element from a closed position to an open position, thereby electrically disconnecting a conductive path between the transformer neutral and the ground.

In Example 15, the transformer protection system of any of the preceding examples is provided, wherein the protection circuit excludes an automatic switching component in series with the direct current blocking component.

In Example 16, the transformer protection system of any of the preceding examples is provided, wherein the control system comprises a programmable control device, the transformer protection system further comprising an electromagnetically-shielded housing surrounding the control system.

In Example 17, the transformer protection system of any of the preceding examples is provided, wherein the single switching element is operable between the open position and the closed position only in response to receipt of an external actuation signal received via an electrical connection from the control system, and wherein the control system is separate from the single switching element.

In Example 18, the transformer protection system of any of the preceding examples is provided, wherein the direct current blocking component includes a resistor in series with one or more capacitors.

In Example 19, the transformer protection system of Example 18 is provided, wherein the resistor is positioned between the one or more capacitors and the transformer neutral.

In Example 20, the transformer protection system of any of the preceding examples is provided, wherein the protection circuit includes a second direct current blocking component electrically connected in parallel with the direct current blocking component.

In Example 21, the transformer protection system of any of the preceding examples is provided, wherein the protection circuit includes a surge protection device electrically connected in parallel with the direct current blocking component.

In Example 22, the transformer protection system of any of the preceding examples is provided, wherein the direct current blocking component is rated for at least 500 volts DC.

In Example 23, the transformer protection system of any of the preceding examples is provided, wherein the control system is configured to, upon identification of an electrical event at the transformer neutral, actuate the single switching element from the open position to the closed position and after a predetermined amount of time, from the closed position to the open position. In some instances, the predetermined amount of time may be between 0.1 and 10 seconds.

In Example 24, the transformer protection system of any of the preceding examples is provided, further comprising a manually-actuated switch electrically connected between the transformer neutral and the protection circuit.

In Example 25, the transformer protection system of any of the preceding examples is provided, wherein the direct current blocking component includes a plurality of capacitors electrically connected in parallel, the direct current blocking component having a direct current withstand threshold that is adjustable after installation of the transformer protection circuit by selective connection of one or more of the plurality of capacitors.

In Example 26, the transformer protection system of any of the preceding examples is provided, wherein one of the sensors is a direct current (DC) detection device electrically connected to detect direct current in the neutral as a result of a spark over between the transformer neutral and ground.

In Example 26, the transformer protection system of any of the preceding examples is provided, wherein a direct current (DC) detection device is electrically connected in series between the ground and each of the single switching element and an overvoltage protection device.

In Example 27, the transformer protection system of any of the preceding examples is provided, wherein the overvoltage event occurs across the overvoltage protection device at a voltage threshold that is below a direct current (DC) voltage withstand of the single switching element in the open position.

In Example 28, the transformer protection system of any of the preceding examples is provided, further including one or more signal line filters along an electrical connection between the control system and another component of the protection circuit, the one or more signal line filters being selected to filter high-frequency electromagnetically induced signals from penetrating the electromagnetically-shielded housing.

In Example 29, the transformer protection system of any of the preceding examples is provided, wherein the single switching element is unshielded.

In Example 30, the transformer protection system of any of the preceding examples is provided, wherein the direct current blocking component and the second direct current blocking component, connected in parallel with each other, are electrically connected in series with a resistor.

In Example 31, the transformer protection system of any of the preceding examples is provided, wherein the surge protection device is a surge capacitor.

In Example 32, a transformer protection circuit electrically connected between a neutral connection of a power grid transformer and a ground, the transformer protection circuit includes: a switch assembly electrically connected between the neutral connection of the power grid transformer and the ground, the switch assembly movable between an open position and a closed position, the switch assembly being configured to break alternating current (AC) and direct current (DC) from passing therethrough between the neutral connection and the ground; a direct current blocking component electrically connected in parallel with the switch assembly between the neutral connection and the ground; an overvoltage protection device electrically connected in parallel with the switch assembly and the direct current blocking component; and a direct current sensor device positioned to detect direct current across the overvoltage protection device.

In Example 33, the transformer protection circuit of Example 32 is provided, wherein the switch assembly includes a direct current switch.

In Example 34, the transformer protection circuit of any of Examples 32-33 is provided, wherein the switch assembly is rated to break DC current of at least 500 amps and at least 500 volts DC.

In Example 35, the transformer protection circuit of any of Examples 32-34 is provided, further comprising a control system electrically connected to a control input of the switch assembly, the control system being electrically connected to one or more sensors associated with the protection circuit to identify electrical events at the transformer neutral and, in response, actuate the switch assembly between the open position and the closed position. In some instances, the control system comprises a programmable control device, the transformer protection system further comprising an electromagnetically shielded housing surrounding the control system.

In Example 36, the transformer protection circuit of Example 35 is provided, wherein the control system is configured to: detect existence of an electrical event at the neutral connection that is capable of causing damage to the power grid transformer; while the switch assembly is open, detect at the direct current sensor device a direct current indicating an overvoltage event causing electrical discharge across the overvoltage protection device; in response to detecting the overvoltage event, actuate the switch assembly from the open position to the closed position and back to the open position.

In Example 37, the transformer protection circuit of Example 36 is provided, wherein the switch assembly is operable between an open position and a closed position only in response to receipt of an external actuation signal received via an electrical connection from a control system separate from the switch.

In Example 38, the transformer protection circuit of Example 32 is provided, further comprising a manually-actuated switch electrically connected adjacent to the transformer neutral.

In Example 39, the transformer protection circuit of Example 32 is provided, wherein the direct current blocking component includes a resistor in series with one or more capacitors.

In Example 40, the transformer protection circuit of Example 39 is provided, wherein the resistor is electrically connected between the one or more capacitors and the transformer neutral.

In Example 41, the transformer protection circuit of Example 32 is provided, further comprising a second direct current blocking component electrically connected in parallel with the direct current blocking component.

In Example 42, the transformer protection circuit of Example 32 is provided, further comprising a surge protection device electrically connected in parallel with the direct current blocking component.

In Example 43, the transformer protection circuit of Example 32 is provided, in which the switch assembly comprises a single switching element, the single switching element comprising a direct current switch.

In Example 44, the transformer protection circuit of Example 32 is provided, wherein the direct current sensor device comprises a shunt resistor electrically connected in series between the ground and each of the switch assembly and the overvoltage protection device.

In Example 45, the transformer protection circuit of Example 32 is provided, wherein the protection circuit lacks an automatic switching component located between the overvoltage protection device and the ground or between the direct current blocking component and the ground.

In Example 46, the transformer protection circuit of Example 32 is provided, wherein the direct current blocking component and the second direct current blocking component, connected in parallel with each other, are electrically connected in series with a resistor.

In Example 47, the transformer protection circuit of Example 32 is provided, wherein the surge protection device is a surge capacitor.

In Example 48, a method of operating a transformer protection circuit is provided, comprising: detecting existence of an electrical event at a transformer neutral of a power grid transformer capable of causing damage to the power grid transformer; in response to detecting the existence of the electrical event, sending an electrical signal to actuate a switch assembly from a closed position to an open position, the switch assembly being electrically connected between the transformer neutral and a ground, thereby electrically disconnecting a conductive path between the transformer neutral and the ground; while the switch assembly is open, detecting a current indicating an overvoltage event causing electrical discharge across an overvoltage protection device that is electrically connected in parallel with the switch assembly; in response to detecting the overvoltage event, actuating the switch assembly from the open position to the closed position and back to the open position.

In Example 49, the method of Example 48 is provided, wherein the current detected indicating an overvoltage event comprises a direct current.

In Example 50, the method of Example 48 is provided, wherein the overvoltage event occurs across the overvoltage protection device at a voltage threshold that is below a direct current (DC) voltage withstand of the switch assembly.

In Example 51, the method of Example 48 is provided, wherein detecting the current indicating the overvoltage event includes detecting the current at a shunt resistor electrically connected in series with the overvoltage protection device between the ground and the transformer neutral.

In Example 52, the method of Example 48 is provided, wherein actuating the switch assembly extinguishes a spark that was established due to the electrical discharge across the overvoltage protection device.

In Example 53, the method of Example 48 is provided, wherein the voltage threshold is in a range of 1 kV to 16 kV.

In Example 54, the method of Example 48 is provided, wherein the direct current (DC) voltage withstand of the switch assembly in the open position is above at least 8 kV.

In Example 55, a transformer protection system comprising: a protection circuit electrically connectable between a neutral connection of a power grid transformer and a ground, the protection circuit comprising: a switch assembly electrically connected between the neutral connection of the power grid transformer and the ground, the switch assembly movable between an open position and a closed position, the switch assembly being configured to break alternating current (AC) and direct current (DC) from passing therethrough between the neutral connection and the ground; a direct current blocking component electrically connected in parallel with the switch assembly between the neutral connection and the ground; an overvoltage protection device electrically connected in parallel with the switch assembly and the direct current blocking component between the neutral connection and the ground; a sensor device positioned within the protection circuit; a control system electrically connected to a control input of the switch assembly and to the sensor device, the control system being electrically connected to one or more sensors associated with the protection circuit including the sensor device, the control system being configured to detect electrical events at the transformer neutral and, in response, actuate the switch assembly between the open position and the closed position, the control circuit being configured to detect, via the sensor device, direct current across the protection circuit when the switch assembly is open.

In Example 56, the transformer protection system of Example 55 is provided wherein the sensor device is positioned to detect direct current across any of the switch assembly, the direct current blocking component, or the overvoltage protection device.

In Example 57, the transformer protection system of Example 55 is provided, wherein the sensor device is electrically connected between a common connection point and the ground, the common connection point being electrically connected to each of the switch assembly, the direct current blocking component, and the overvoltage protection device.

In Example 58, the transformer protection system of Example 55 is provided, wherein the switch assembly includes a direct current switch.

In Example 59, the transformer protection system of Example 55 is provided, wherein the switch assembly comprises a single switching element.

In Example 60, the transformer protection system of Example 59 is provided, wherein the single switching element is a direct current switch.

In Example 61, the transformer protection system of Example 55 is provided, wherein the switch assembly is operable between the open position and the closed position only in response to receipt of an external actuation signal received via an electrical connection from the control system, and wherein the control system is separate from the switch assembly.

In Example 62, the transformer protection system of Example 55 is provided, wherein the overvoltage protection device is selected from among a spark gap, a metal oxide varistor (MOV), or a surge arrester.

In Example 63, the transformer protection system of Example 55 is provided, wherein the direct current blocking component is selected from among: one or more capacitors, one or more resistors, or a combination thereof.

In Example 64, the transformer protection system of Example 63 is provided, wherein the direct current blocking component includes a resistor in series with one or more capacitors.

In Example 65, the transformer protection system of Example 55 is provided, wherein the direct current blocking component is rated for at least 500 volts DC.

In Example 66, the transformer protection system of Example 55 is provided, wherein the control system comprises a programmable control device, the transformer protection system further comprising an electromagnetically shielded housing surrounding the control system.

In Example 67, the transformer protection system of Example 55 is provided, wherein the protection circuit lacks any automatic switching component in series with the overvoltage protection device.

In Example 68, the transformer protection system of Example 55 is provided, wherein while the switch assembly is closed, a first AC current path remains between the transformer neutral and ground through the switch assembly and a second AC current path remains between the transformer neutral and ground through the direct current blocking component.

In Example 69, the transformer protection system of Example 55 is provided, wherein the protection circuit lacks any automatic switching component in series with the direct current blocking component.

In Example 70, the transformer protection system of Example 55 is provided, wherein the protection circuit includes a surge protection device electrically connected in parallel with the direct current blocking component.

In Example 71, the transformer protection system of Example 70 is provided, wherein the surge protection device has an impedance at 60 Hz that is higher than an impedance of the direct current blocking component at 60 Hz.

In Example 72, the transformer protection system of Example 71 is provided, wherein the surge protection device is a surge capacitor.

In Example 73, the transformer protection system of Example 55 is provided, wherein the protection circuit includes an arrester electrically connected in parallel with the direct current blocking component.

In Example 74, a transformer protection circuit is electrically connected between a neutral connection of a power grid transformer and a ground, the transformer protection circuit comprising: a switch assembly electrically connected between the neutral connection of the power grid transformer and the ground, the switch assembly movable between an open position and a closed position, the switch assembly being configured to break alternating current (AC) and direct current (DC) from passing therethrough between the neutral connection and the ground; a direct current blocking component electrically connected in parallel with the switch assembly between the neutral connection and the ground; a surge protection device electrically connected in parallel with the switch assembly and the direct current blocking component; and an overvoltage protection device electrically connected in parallel with the switch assembly, the direct current blocking component, and the surge protection device.

In Example 75, the transformer protection circuit of Example 74 is provided, further comprising a direct current sensor device positioned to detect direct current across the transformer protection circuit when the switch assembly is open.

In Example 76, the transformer protection circuit of Example 74 is provided, wherein the switch assembly includes a direct current switch.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A transformer protection system comprising:

a protection circuit electrically connectable between a neutral connection of a power grid transformer and a ground, the protection circuit comprising:

a single switching element electrically connected between the neutral connection of the power grid transformer and the ground, the single switching element movable between an open position and a closed position, and being configured to break alternating current (AC) and direct current (DC) from passing therethrough between the neutral connection and the ground without reliance on a zero-crossing of electrical current at the single switching element;

a direct current blocking component electrically connected in parallel with the single switching element between the neutral connection and the ground, wherein the direct current blocking component is rated for at least 500 volts DC; and a control system electrically connected to a control input of the single switching element, the control system being electrically connected to one or more sensors associated with the protection circuit to identify electrical events at the transformer neutral and, in response, actuate the single switching element between the open position and the closed position.

2. The transformer protection system of claim 1, wherein while the single switching element is closed, AC current has two or more paths to ground through the protection circuit.

3. The transformer protection system of claim 1, wherein the single switching element is a direct current switch, and wherein the direct current switch has a voltage withstand of at least 500 volts DC.

4. The transformer protection system of claim 1, wherein the single switching element has a default position and an actuated position, the default position being a closed position and the actuated position being an open position, and wherein the control system is configured to actuate the single switching element from the closed position to the open position in response to identification of an electrical event that is capable of causing damage to the power grid transformer.

5. The transformer protection system of claim 1, wherein the control system is configured to:

in response to presence of an electromagnetic pulse event, entering a mode in which the default position corresponds to the open position.

6. The transformer protection system of claim 1, wherein the control system is configured to:

in response to presence of a direct current signal above a threshold current level and an alternating current signal below 3000 amps, actuate the single switching element to the open position.

7. The transformer protection system of claim 1, further comprising an overvoltage protection device electrically connected in parallel with the single switching element and the direct current blocking component.

8. The transformer protection system of claim 7, wherein the protection circuit forms a first parallel path between the transformer neutral and ground across the single switching element, a second parallel path between the transformer neutral and ground across the DC blocking component, and a third parallel path between the transformer neutral and ground across the overvoltage protection device, and wherein no automatic switch is placed along the second or third parallel paths.

9. The transformer protection system of claim 7, wherein one of the sensors is a direct current (DC) detection device electrically connected in a position to detect direct current (DC) across the overvoltage protection device.

10. The transformer protection system of claim 9, where the direct current (DC) detection device comprises a shunt resistor.

11. The transformer protection system of claim 9, wherein the control system is further configured to:

while the single switching element is open, detect at the direct current (DC) detection device a direct current indicating an overvoltage event causing electrical discharge across the overvoltage protection device;

in response to detecting the overvoltage event, actuate the single switching element from the open position to the closed position and back to the open position.

12. The transformer protection system of claim 9, wherein an overvoltage event occurs across the overvoltage protection device at a voltage threshold that is below a direct current (DC) voltage withstand of the single switching element.

13. The transformer protection system of claim 9, further including a plurality of overvoltage protection devices electrically connected in parallel with each other.

14. The transformer protection system of claim 1, wherein the control system is configured to:

detect existence of an electrical event at the neutral connection that is capable of causing damage to the power grid transformer;

in response to detecting the existence of the electrical event, send an electrical signal to actuate the single switching element from a closed position to an open position, thereby electrically disconnecting a conductive path between the transformer neutral and the ground.

15. The transformer protection system of claim 1, wherein the protection circuit excludes an automatic switching component in series with the direct current blocking component.

16. The transformer protection system of claim 1, wherein the control system comprises a programmable control device, the transformer protection system further comprising an electromagnetically-shielded housing surrounding the control system.

17. The transformer protection system of claim 1, wherein the single switching element is operable between the open position and the closed position only in response to receipt of an external actuation signal received via an electrical connection from the control system, and wherein the control system is separate from the single switching element.

18. The transformer protection system of claim 1, wherein the direct current blocking component includes a resistor in series with one or more capacitors.

19. The transformer protection system of claim 18, wherein the resistor is positioned between the one or more capacitors and the transformer neutral.

20. The transformer protection system of claim 1, wherein the protection circuit includes a second direct current blocking component electrically connected in parallel with the direct current blocking component.

21. The transformer protection system of claim 1, wherein the protection circuit includes a surge protection device electrically connected in parallel with the direct current blocking component.

22. The transformer protection system of claim 1, wherein the control system is configured to, upon identification of an electrical event at the transformer neutral, actuate the single switching element from the open position to the closed position and after a predetermined amount of time, from the closed position to the open position.

23. The transformer protection system of claim 1, further comprising a manually-actuated switch electrically connected between the transformer neutral and the protection circuit.

24. A transformer protection circuit electrically connected between a neutral connection of a power grid transformer and a ground, the transformer protection circuit comprising:

a switch assembly electrically connected between the neutral connection of the power grid transformer and the ground, the switch assembly movable between an open position and a closed position, the switch assembly being configured to break alternating current (AC) and direct current (DC) from passing therethrough between the neutral connection and the ground;

a direct current blocking component electrically connected in parallel with the switch assembly between the neutral connection and the ground, wherein the switch assembly is rated to break DC current of at least 500 amps and at least 500 volts DC;

an overvoltage protection device electrically connected in parallel with the switch assembly and the direct current blocking component; and a direct current sensor device positioned to detect direct current across the overvoltage protection device.

25. The transformer protection circuit of claim 24, wherein the switch assembly includes a direct current switch.

26. The transformer protection circuit of claim 24, further comprising a control system electrically connected to a control input of the switch assembly, the control system being electrically connected to one or more sensors associated with the protection circuit to identify electrical events at the transformer neutral and, in response, actuate the switch assembly between the open position and the closed position.

27. The transformer protection circuit of claim 26, wherein the control system is configured to:

detect existence of an electrical event at the neutral connection that is capable of causing damage to the power grid transformer;

while the switch assembly is open, detect at the direct current sensor device a direct current indicating an overvoltage event causing electrical discharge across the overvoltage protection device;

in response to detecting the overvoltage event, actuate the switch assembly from the open position to the closed position and back to the open position.

28. The transformer protection circuit of claim 24, wherein the switch assembly is operable between an open position and a closed position only in response to receipt of an external actuation signal received via an electrical connection from a control system separate from the switch.

29. The transformer protection circuit of claim 24, further comprising a manually-actuated switch electrically connected adjacent to the transformer neutral.

30. The transformer protection circuit of claim 24, wherein the direct current blocking component includes a resistor in series with one or more capacitors.

31. The transformer protection circuit of claim 30, wherein the resistor is electrically connected between the one or more capacitors and the transformer neutral.

32. The transformer protection circuit of claim 24, further comprising a second direct current blocking component electrically connected in parallel with the direct current blocking component.

33. The transformer protection circuit of claim 24, further comprising a surge protection device electrically connected in parallel with the direct current blocking component.

34. A method of operating a transformer protection circuit comprising:

detecting existence of an electrical event at a transformer neutral of a power grid transformer capable of causing damage to the power grid transformer;

in response to detecting the existence of the electrical event, sending an electrical signal to actuate a switch assembly from a closed position to an open position, the switch assembly being electrically connected between the transformer neutral and a ground, thereby electrically disconnecting a conductive path between the transformer neutral and the ground;

while the switch assembly is open, detecting a current indicating an overvoltage event causing electrical discharge across an overvoltage protection device that is electrically connected in parallel with the switch assembly; and in response to detecting the overvoltage event, actuating the switch assembly from the open position to the closed position and back to the open position.

35. The method of claim 34, wherein the current detected indicating an overvoltage event comprises a direct current.

36. The method of claim 34, wherein the overvoltage event occurs across the overvoltage protection device at a voltage threshold that is below a direct current (DC) voltage withstand of the switch assembly.

37. A transformer protection system comprising:

a protection circuit electrically connectable between a neutral connection of a power grid transformer and a ground, the protection circuit comprising:

a single switching element electrically connected between the neutral connection of the power grid transformer and the ground, the single switching element movable between an open position and a closed position, and being configured to break alternating current (AC) and direct current (DC) from passing therethrough between the neutral connection and the ground without reliance on a zero-crossing of electrical current at the single switching element;

a direct current blocking component electrically connected in parallel with the single switching element between the neutral connection and the ground; and a control system electrically connected to a control input of the single switching element, the control system being electrically connected to one or more sensors associated with the protection circuit to identify electrical events at the transformer neutral and, in response, actuate the single switching element between the open position and the closed position;

wherein the control system is configured to, upon identification of an electrical event at the transformer neutral, actuate the single switching element from the open position to the closed position and after a predetermined amount of time, from the closed position to the open position.

* * * * *